US009941759B2

United States Patent
Oryu et al.

(10) Patent No.: US 9,941,759 B2
(45) Date of Patent: Apr. 10, 2018

(54) STATOR WINDING ARRANGEMENT OF SUPERCONDUCTING ROTATING MACHINE

(71) Applicant: KAWASAKI JUKOGYO KABUSHIKI KAISHA, Kobe-shi, Hyogo (JP)

(72) Inventors: Tamami Oryu, Kakogawa (JP); Katsuya Umemoto, Akashi (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 290 days.

(21) Appl. No.: 14/440,159

(22) PCT Filed: Sep. 3, 2013

(86) PCT No.: PCT/JP2013/005202
§ 371 (c)(1),
(2) Date: May 1, 2015

(87) PCT Pub. No.: WO2014/068827
PCT Pub. Date: May 8, 2014

(65) Prior Publication Data
US 2015/0295464 A1 Oct. 15, 2015

(30) Foreign Application Priority Data
Nov. 1, 2012 (JP) ................................. 2012-242008

(51) Int. Cl.
*H02K 3/14* (2006.01)
*H02K 55/04* (2006.01)

(52) U.S. Cl.
CPC .............. *H02K 3/14* (2013.01); *H02K 55/04* (2013.01); *Y02E 40/625* (2013.01)

(58) Field of Classification Search
CPC .. H02K 3/14; H02K 3/12; H02K 3/04; H02K 3/46; H02K 3/47; H02K 3/48; H02K 3/50; H02K 55/04; H02K 55/02; Y02E 40/625
(Continued)

(56) References Cited

U.S. PATENT DOCUMENTS

2012/0038238 A1* 2/2012 Ishikawa .................. H02K 3/28
310/208
2012/0161568 A1* 6/2012 Umemoto .............. H02K 55/04
310/208

FOREIGN PATENT DOCUMENTS

JP H04-285462 A 10/1992
JP 2000-217282 A 8/2000
(Continued)

OTHER PUBLICATIONS

Dec. 3, 2013 International Search Report issued in International Patent Application No. PCT/JP2013/005202.

*Primary Examiner* — Michael Andrews
(74) *Attorney, Agent, or Firm* — Oliff PLC

(57) ABSTRACT

A unit winding formed by bundling conductor strands in a first slot first sectional region from one end in a stator axial direction toward the other end is turned back so that positions of the insulating conductor strands are inverted in the axial direction. The unit winding is disposed into a second slot third sectional region from the other end in the axial direction toward the one side, and turned back so that the positions of the strands are inverted in a circumferential direction. Then, the turned back unit winding is disposed into the first slot second sectional region from the one end in the axial direction toward the other side, and turned back so that positions of the strands are inverted in the axial direction. The unit winding is disposed in the second slot
(Continued)

fourth sectional region from the other end in the axial direction toward the one end.

7 Claims, 17 Drawing Sheets

(58) Field of Classification Search
USPC .......................... 310/213, 195, 201–207, 208
See application file for complete search history.

(56) References Cited

FOREIGN PATENT DOCUMENTS

| | | |
|---|---|---|
| JP | 2005-176578 A | 6/2005 |
| JP | 2006-325338 A | 11/2006 |
| WO | 2011/030874 A1 | 3/2011 |

* cited by examiner

STATOR WINDING ARRANGEMENT OF SUPERCONDUCTING ROTATING MACHINE

TECHNICAL FIELD

The present invention relates to a stator of a superconducting rotating machine, and a superconducting rotating machine.

BACKGROUND ART

A superconducting rotating machine using a superconducting winding, which causes a superconducting phenomenon, is typically an electric motor or a power generator composed of a stator, a rotor, and a housing supporting the rotor and the stator. Notably, examples of rotating machines other than a superconducting rotating machine include a normal conducting rotating machine using a normal conducting winding which does not cause a superconducting phenomenon. A superconducting rotating machine generally has a radial gap type structure in which a rotor is made superconducting (superconducting field winding) and a stator is made normal-conducting (normal conductive armature winding).

A stator in a normal conducting rotating machine is composed of an iron core made of a ferromagnetic material such as iron, and a stator winding disposed in a concave-shaped groove, which is formed on the iron core and called a slot. The iron core is formed by stacking alloy steels having small magnetic hysteresis and high saturation magnetization, such as an electromagnetic steel sheet. According to the iron core thus disposed, a magnetic flux from the rotor is converged to the iron core, whereby a magnetic field strength as well as rotation force can be increased.

On the other hand, the stator of the superconducting rotating machine uses an air-cored structure having no iron core. The reason of this is as follows. The superconducting rotating machine has high magnetic flux. Therefore, if an iron core is used, the superconducting rotating machine is easy to reach a saturated magnetic flux state, and further, an eddy current loss is easy to occur at the iron core part. For example, PTL 1 describes a structure of a so-called full superconducting rotating machine in which both a rotor and a stator are made superconducting, but an air-cored superconducting winding is disposed on an inner surface of the cylindrical stator in a circumferential direction, different from the above normal structure.

Notably, it has been known that, even if a stator of a superconducting rotating machine uses an air-cored structure having no iron core, it has a copper loss and an eddy current loss as main losses, similar to a stator of a normal conducting rotating machine.

A copper loss occurs as electric resistance heat due to a current flowing through a stator winding. In order to reduce the copper loss, a technique in which a cross section of a stator winding is increased to suppress a current density in order to reduce an electric resistance has been known. For example, PTL 2 discloses that a copper loss generating on a stator is reduced by increasing a space factor of a winding in a slot.

On the other hand, an eddy current loss occurs as electric resistance heat caused by an eddy current generated around a magnetic flux. For example, PTL 3 describes that a stranded wire formed by twisting a plurality of thin strands is disposed at an inlet part of a slot through which a large amount of leakage magnetic flux passes, and a bundle wire in which a plurality of thin strands is not twisted is disposed at a rear part of the slot in which a gap enlarges by disposing the stranded wire. Notably, the bundle wire in PTL 3 is provided not to reduce an eddy current loss but to increase a space factor of a winding in a slot.

CITATION LIST

Patent Literature

PTL1: Japanese Unexamined Patent Application Publication No. 2005-176578
PTL2: Japanese Unexamined Patent Application Publication No. 2000-217282
PTL3: Japanese Unexamined Patent Application Publication No. 2006-325338

SUMMARY OF INVENTION

Technical Problem

A stator with an air-cored structure having no iron core is effective for avoiding a saturated magnetic flux state. However, since an iron core for converging a magnetic flux from a rotor is not present, a magnetic flux interlinking across a stator winding disposed in each slot between teeth is revealed, with the result that an eddy current loss is revealed. In order to reduce the eddy current loss, a technique of using a plurality of thin strands (strand segmentation) and twisting these strands has been known as described above. However, in this technique, a gap between stranded wires becomes large, so that a space factor of a winding in a slot is decreased. Therefore, this technique cannot efficiently reduce a copper loss occurring on a stator, thereby being disadvantageous for increasing efficiency (for increasing power conversion efficiency) of a superconducting rotating machine.

The present invention is achieved to solve the above-described problems, and an object is to increase efficiency (to increase power conversion efficiency) of a radial gap type superconducting rotating machine in which a rotor is made superconducting, a stator is made normal-conducting, and a stator winding disposed on the stator is made air-cored.

Solution to Problem

In order to attain the foregoing object, a stator of a superconducting rotating machine, according to one aspect of the present invention, is disposed to surround a circumference of a rotor in which a plurality of field windings using a superconducting wire are disposed in a circumferential direction, and has a plurality of unit windings constituting an air-cored stator winding, the stator comprising: a plurality of teeth disposed on an inner circumference, opposite to the field windings of the rotor, in a circumferential direction; and a plurality of slots formed between the teeth adjacent to each other, wherein each of the slots is sectioned into a first sectional region that is a radially outer side and circumferentially one side of the stator as viewed from an axial direction, a second sectional region that is a radially outer side and circumferentially other side of the stator, a third sectional region that is a radially inner side and circumferentially one side of the stator, and a fourth sectional region that is a radially inner side and circumferentially other side of the stator, the unit winding includes a plurality of insulating conductor strands, and is formed by bundling the plurality of insulating conductor strands, and for a first slot and a second slot, which are apart from each other by a predetermined slot number, out of the plurality of slots, the unit winding disposed to be introduced from one end in an axial direction of the stator into the first sectional region of the first slot and to be drawn from the other end in the axial direction is turned back in such a manner that positions of the plurality of insulating conductor strands constituting the unit winding are inverted in the radial direction of the stator from inside to outside and from inside to outside at the other end in the axial direction, the unit winding turned back in the radial direction is disposed so as to be introduced into the third sectional region of the second slot from the other end in the axial direction and to be drawn from the one end in the axial direction, and is turned back in such a manner that the positions of the plurality of insulating conductor strands constituting the unit winding are inverted in the circumferential direction of the stator from one side to the other side and from the other side to one side at the one end in the axial direction, the unit winding turned back in the circumferential direction is disposed so as to be introduced into the second sectional region of the first slot from the one end in the axial direction and to be drawn from the other end in the axial direction, and is turned back in such a manner that positions of the plurality of insulating conductor strands constituting the unit winding are inverted in the radial direction of the stator from inside to outside and from inside to outside at the other end in the axial direction, and the unit winding turned back in the radial direction is disposed so as to be introduced into the fourth sectional region of the second slot from the other end in the axial direction and to be drawn from the one end in the axial direction.

In this configuration, the unit winding is not formed from one thick insulating conductor strand, but is formed by bundling a plurality of insulating conductor strands, whereby an in-strand eddy current can be suppressed with segmentation of a unit winding.

In addition, with the above configuration, the positions of the insulating conductor strands of the unit winding disposed in the first sectional region of the first slot and the position of the insulating conductor strands of the unit winding disposed in the second sectional region of the first slot are in a positional relation of point symmetry, as viewed from one end in the axial direction. According to this, the direction of the inter-strand circulating eddy current of the unit winding disposed in the first sectional region and the direction of the inter-strand circulating eddy current of the unit winding disposed in the second sectional region are reverse to each other, so that the inter-strand circulating eddy currents of both unit windings are canceled with each other. Similarly, the positions of the insulating conductor strands of the unit winding disposed in the third sectional region of the second slot and the position of the insulating conductor strands of the unit winding disposed in the fourth sectional region of the second slot are in a positional relation of point symmetry, as viewed from the other end in the axial direction. According to this, the direction of the inter-strand circulating eddy current of the unit winding disposed in the third sectional region and the direction of the inter-strand circulating eddy current of the unit winding disposed in the fourth sectional region are reverse to each other, so that the inter-strand circulating eddy currents of both unit windings are canceled with each other.

From the above, this configuration can suppress the generation of in-strand eddy current and inter-strand circulating eddy current to increase efficiency in a superconducting rotating machine in which a rotor is made superconducting, a stator is made normal-conducting, and a stator winding disposed on the stator is made air-cored.

In order to attain the foregoing object, a stator of a superconducting rotating machine, according to another aspect of the present invention, is disposed to surround a circumference of a rotor in which a plurality of field windings are disposed in a circumferential direction, the stator comprising: a plurality of unit windings constituting an air-cored stator winding, each of the unit windings including a plurality of insulating conductor strands; a plurality of teeth disposed on an inner circumference, opposite to the field windings of the rotor, in a circumferential direction; and a plurality of slots formed between the teeth adjacent to each other, wherein, in the case where, in each slot, a radially outer side and circumferentially one side of the stator viewed from an axial direction is specified as a first sectional region, a radially outer side and circumferentially other side of the stator is specified as a second sectional region, a radially inner side and circumferentially one side of the stator is specified as a third sectional region, and a radially inner side and circumferentially other side of the stator is specified as a fourth sectional region, the unit winding is disposed in such a manner that, for a first slot and a second slot, which are apart from each other by a predetermined slot number, out of the plurality of slots, the unit winding is introduced into the first sectional region of the first slot from one end in the axial direction of the stator and is drawn from the other end in the axial direction, then, turned back in the radial direction of the stator, then, introduced into the third sectional region of the second slot from the other end in the axial direction and to be drawn from the one end in the axial direction, then, turned back in the circumferential direction of the stator, then, introduced into the second sectional region of the first slot from the one end in the axial direction and to be drawn from the other end in the axial direction, then, turned back in the radial direction of the stator, and then, introduced into the fourth sectional region of the second slot from the other end in the axial direction and to be drawn from the one end in the axial direction.

In this configuration, the unit winding is not formed from one thick insulating conductor strand, but is formed by bundling a plurality of insulating conductor strands, whereby an in-strand eddy current can be suppressed with segmentation of a unit winding.

In addition, with the above configuration, the direction of the inter-strand circulating eddy current of the unit winding disposed in the first sectional region and the direction of the inter-strand circulating eddy current of the unit winding disposed in the second sectional region are reverse to each other, so that the inter-strand circulating eddy currents of both unit windings are canceled with each other. Similarly, the direction of the inter-strand circulating eddy current of the unit winding disposed in the third sectional region and the direction of the inter-strand circulating eddy current of the unit winding disposed in the fourth sectional region are reverse to each other, so that the inter-strand circulating eddy currents of both unit windings are canceled with each other.

From the above, this configuration can suppress the generation of in-strand eddy current and inter-strand circulating eddy current to increase efficiency in a superconducting rotating machine in which a rotor is made superconducting, a stator is made normal-conducting, and a stator winding disposed on the stator is made air-cored.

In the above stator of a superconducting rotating machine, in one of unit windings and another unit winding connected in series, a terminal end of one of unit windings and a starting end of the other unit winding may be connected at the one end in the axial direction via an electric wire that is turned back similarly to the other end in the axial direction.

With this configuration, one unit winding and the other winding are connected in series with an inter-coil connection with a winding manner similar to the winding manner of the unit winding at the other end in the axial direction, whereby the inter-strand circulating eddy current that cannot be canceled but remains only by the winding manner of only the unit winding can be suppressed.

In order to attain the foregoing object, a stator of a superconducting rotating machine, according to still another aspect of the present invention, is disposed to surround a circumference of a rotor in which a plurality of field windings using a superconducting wire are disposed in a circumferential direction, and has a plurality of unit windings constituting an air-cored stator winding, the stator comprising: a plurality of teeth disposed on an inner circumference, opposite to the field windings of the rotor, in a circumferential direction; and a plurality of slots formed between the teeth adjacent to each other, wherein each slot is sectioned into a radially outer side region and a radially inner side region of the stator, the unit winding includes a plurality of insulating conductor strands, and is formed by bundling the plurality of insulating conductor strands, and for a first slot and a second slot, which are apart from each other by a predetermined slot number, out of the plurality of slots, the unit winding disposed to be introduced from one end in an axial direction of the stator into the radially outer side region of the first slot and to be drawn from the other end in the axial direction is turned back in such a manner that positions of the plurality of insulating conductor strands constituting the unit winding are inverted in the circumferential direction of the stator from one side to the other side and from the other side to one side at the other end in the axial direction, and the unit winding turned back in the circumferential direction is disposed so as to be introduced into the radially inner side region of the second slot from the other end in the axial direction and to be drawn from the one end in the axial direction.

With the above configuration, the direction of the inter-strand circulating eddy current of a group of row components of the unit winding disposed in the radially outer side region of the first slot and the direction of the inter-strand circulating eddy current of a group of row components of the unit winding disposed in the radially inner side region of the second slot become reverse to each other, whereby the inter-strand circulating eddy currents of both component groups can be canceled. Thus, this configuration can increase efficiency in a superconducting rotating machine in which a rotor is made superconducting, a stator is made normal-conducting, and a stator winding disposed on the stator is made air-cored.

In order to attain the foregoing object, a stator of a superconducting rotating machine, according to still another aspect of the present invention, is disposed to surround a circumference of a rotor in which a plurality of field windings are disposed in a circumferential direction, the stator comprising: a plurality of unit windings constituting an air-cored stator winding, each of the unit windings including a plurality of insulating conductor strands; a plurality of teeth disposed on an inner circumference, opposite to the field windings of the rotor, in a circumferential direction; and a plurality of slots formed between the teeth adjacent to each other, wherein, in the case where, in each slot, a radially outer side region of the stator is specified as an outer side region, and a radially inner side region of the stator is specified as an inner side region, the unit winding is disposed in such a manner that, for a first slot and a second slot, which are apart from each other by a predetermined slot number, out of the plurality of slots, the unit winding is introduced into the outer side region of the first slot from one end in an axial direction of the stator and is drawn from the other end in the axial direction, then, turned back in the circumferential direction of the stator, and then, introduced into the inner side region of the second slot from the other end in the axial direction and to be drawn from the one end in the axial direction.

With the above configuration, the direction of the inter-strand circulating eddy current of a group of row components of the unit winding disposed in the radially outer side region of the first slot and the direction of the inter-strand circulating eddy current of a group of row components of the unit winding disposed in the radially inner side region of the second slot become reverse to each other, whereby the inter-strand circulating eddy currents of both component groups can be canceled. Thus, this configuration can increase efficiency in a superconducting rotating machine in which a rotor is made superconducting, a stator is made normal-conducting, and a stator winding disposed on the stator is made air-cored.

In the above stator of a superconducting rotating machine, the unit winding may be formed by bundling the plurality of insulating conductor strands such that a rectangular cross section of each of the plurality insulating conductor strands is disposed in a matrix.

With this configuration, a space factor of the insulating conductor strands in each slot is increased, whereby a density of the unit winding is increased. In other words, this configuration can easily narrow a region of a slot storing necessary number of insulating conductor strands, thereby downsizing a superconducting rotating machine.

In the above stator of a superconducting rotating machine, a terminal end of one of unit windings, which is connected in series, and a starting end of the other unit winding may be connected at the one end in the axial direction via an electric wire in such a manner that the positions of the insulating conductor strands in a matrix arrangement at the terminal end of one of the unit windings and the positions of the insulating conductor strands in a matrix arrangement at the starting end of the other unit winding are associated with each other.

According to the above configuration, in order to attain the foregoing object, a superconducting rotating machine according to still another aspect of the present invention is a radial-gap type superconducting rotating machine including any one of the above stators, wherein a rotor is made superconducting, the stator is made normal-conducting, and a stator winding disposed on the stator is made air-cored.

Advantageous Effects of Invention

According to the present invention, a radial-gap type superconducting rotating machine in which a rotor is made superconducting, a stator is made normal-conducting, and a stator winding disposed on the stator is made air-cored can be downsized and can be configured to have increased efficiency.

DESCRIPTION OF EMBODIMENTS (Viewpoints of the Present Invention)

The present inventors have focused on a point in which an eddy current loss can be classified into a loss caused by an in-strand eddy current locally generated in a strand of a stator winding and a loss caused by an inter-strand circulating eddy current flowing through a strand of a stator winding.

Figure 13:
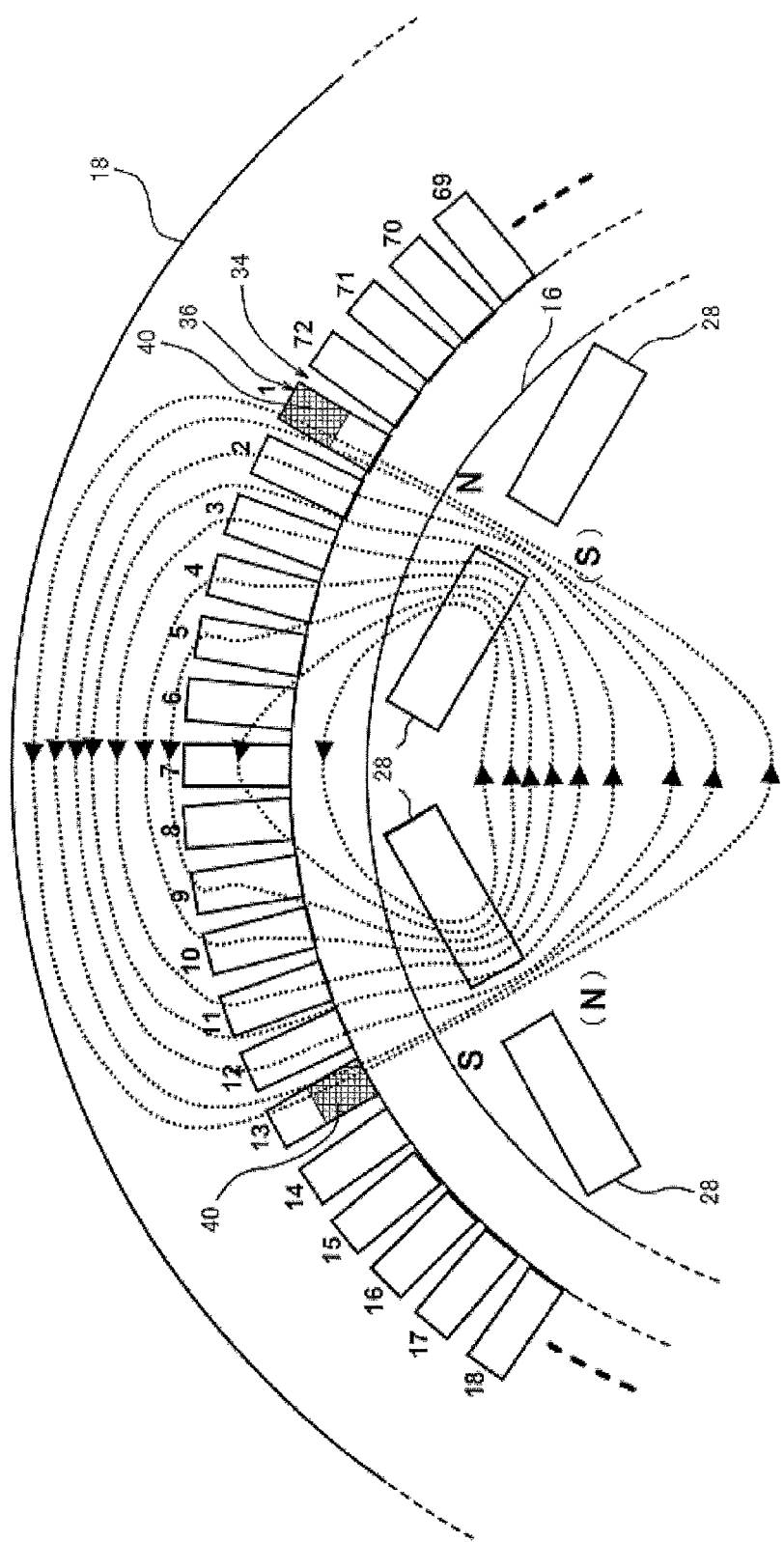
FIG. 13 is a view showing a magnetic flux distribution of a rotating machine of a rotating field type having an air-cored stator.
Figure 14:
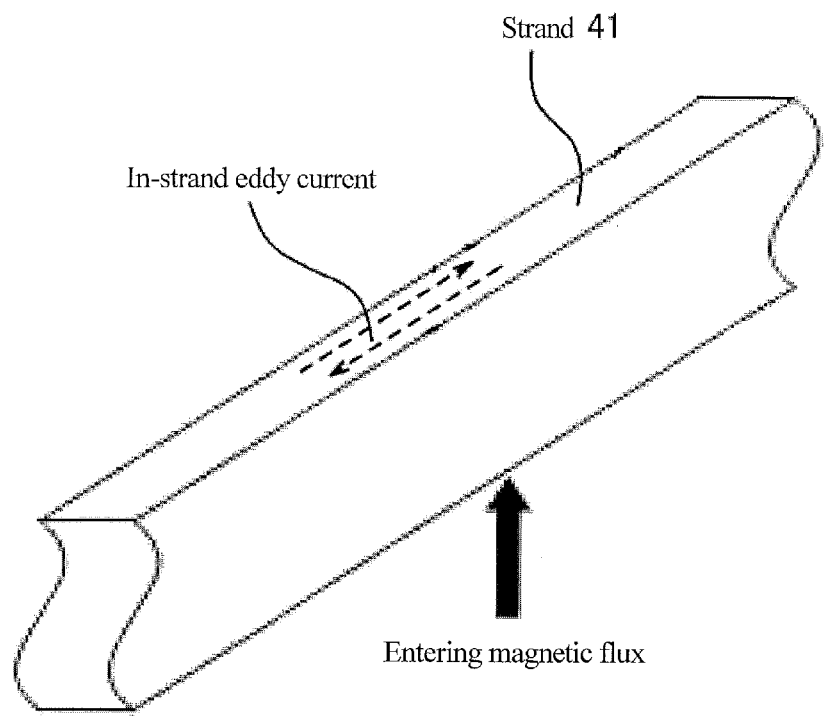
FIG. 14 is a schematic view for describing an in-strand eddy current.
Figure 15:
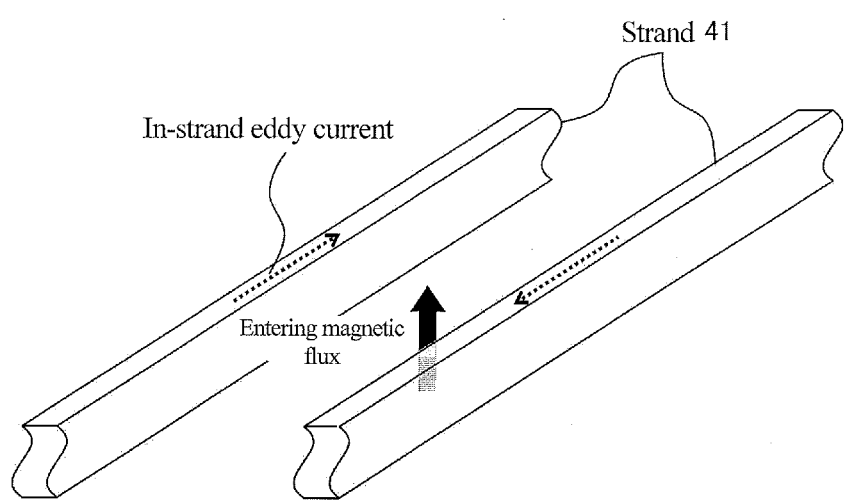
FIG. 15 is a schematic view for describing an inter-strand eddy current.

An in-strand eddy current and an inter-strand eddy current will be described below with reference to FIGS. 13, 14, and 15. FIG. 13 is a view showing a magnetic flux distribution of a rotating machine of a rotating field type having an air-cored stator. FIG. 14 is a schematic view for describing an in-strand eddy current, and FIG. 15 is a schematic view for describing an inter-strand circulating eddy current.

As shown in FIG. 13, a superconducting coil 28 constituting a pair of N and S magnetic poles in a circumferential direction is disposed at an outer circumference of a rotor 16. On the other hand, a plurality of teeth 34 is disposed in a circumferential direction at an inner circumference of the stator 18 surrounding the outer circumference of the rotor 16, and a stator winding 40 is disposed at a slot 36 which is formed between the adjacent teeth 34 and individually denoted by a unique slot number. Notably, a linear portion of one stator winding 40 at one end 40a is disposed to face an N pole of the magnetic pole pair constituted by the superconducting coil 28 of the rotor 16 at a radially outer side of the slot 36. A linear portion of the stator winding 40 at the other end 40b is disposed to face an S pole of the magnetic pole pair constituted by the superconducting coil 28 of the rotor 16 at a radially inner side of the slot 36. In an air-cored stator, the teeth 34 are not an iron core made of a ferromagnetic material such as iron. Therefore, a magnetic flux is not converged to the iron core of the teeth 34, resulting in that a magnetic flux interlinking across the stator winding 40 disposed in the slot 36 occurs along a radial direction of the slot 36. An in-strand eddy current is generated in each strand 41 constituting the stator winding (see FIG. 14), and an inter-strand circulating eddy current circulating among strands 41 constituting the stator winding is generated (see FIG. 15) so as to cancel the change of this interlinkage magnetic flux.

In order to reduce an in-strand eddy current loss, it is better to use a bundle wire constituted by bundling a plurality of thin parallel strands with a circular or rectangular cross-section than to use a single thick strand. This has been well known.

On the other hand, a countermeasure for reducing an inter-strand circulating eddy current loss has not conventionally been mentioned in particular. It is to be noted that, as stated in "Solution to Problem", a magnetic flux interlinking among strands can be canceled by twisting a plurality of strands. However, when this technique is employed, a space factor of a winding in a slot is decreased. In view of this, the present inventors have arrived at a configuration in which strands are disposed in a slot in a specific manner for reducing an inter-strand circulating eddy current loss.

Hereinafter, the embodiments of the present invention will be described with reference to the drawings. In the following, through all the drawings, the same or equivalent elements will be given the same reference numerals, and redundant description will be omitted.

Embodiment 1

[Structural Example of Superconducting Rotating Machine]

Figure 1:
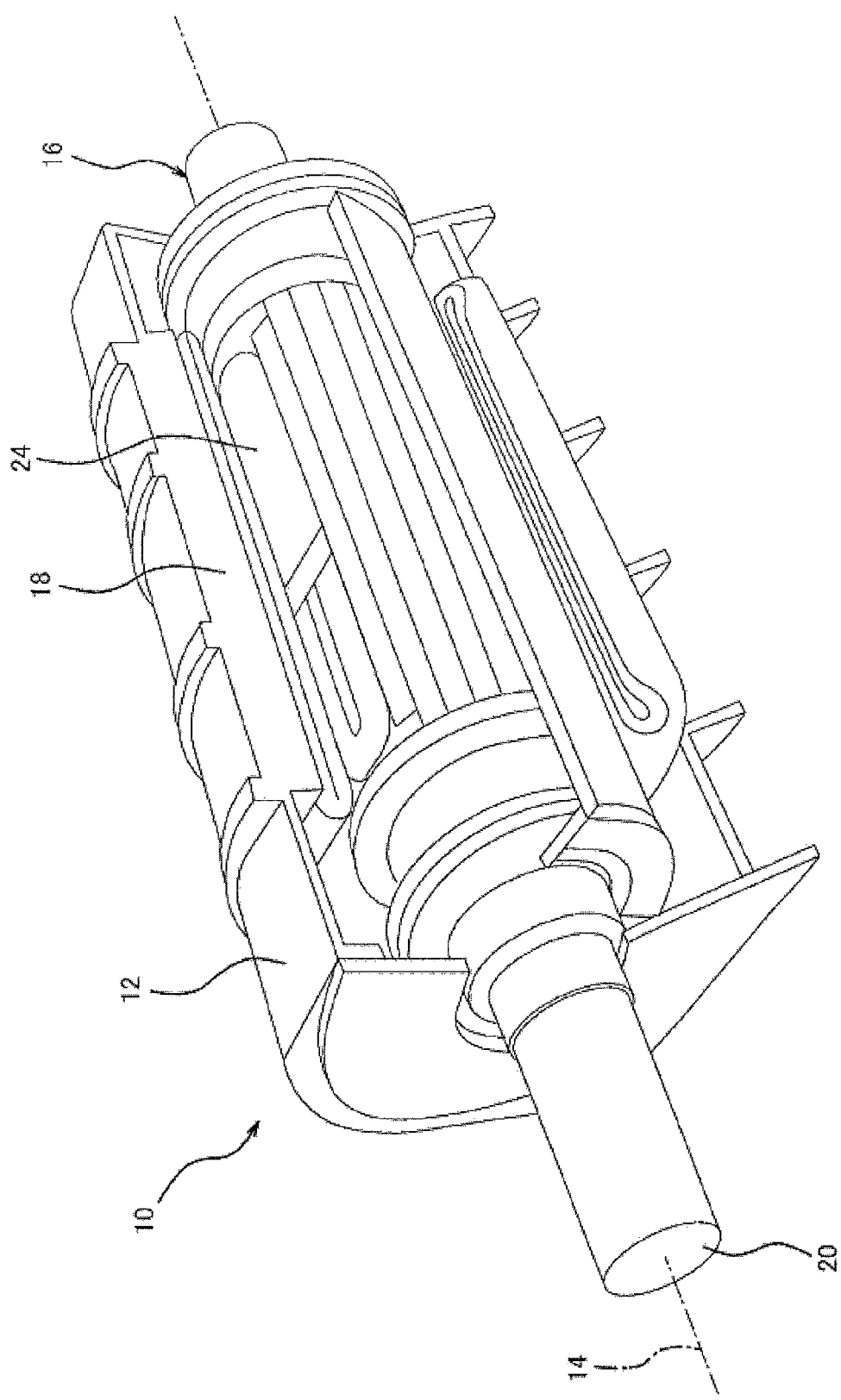
FIG. 1 is a view showing an external appearance example and an internal structural example of a superconducting rotating machine according to Embodiment 1 of the present invention.
Figure 2:
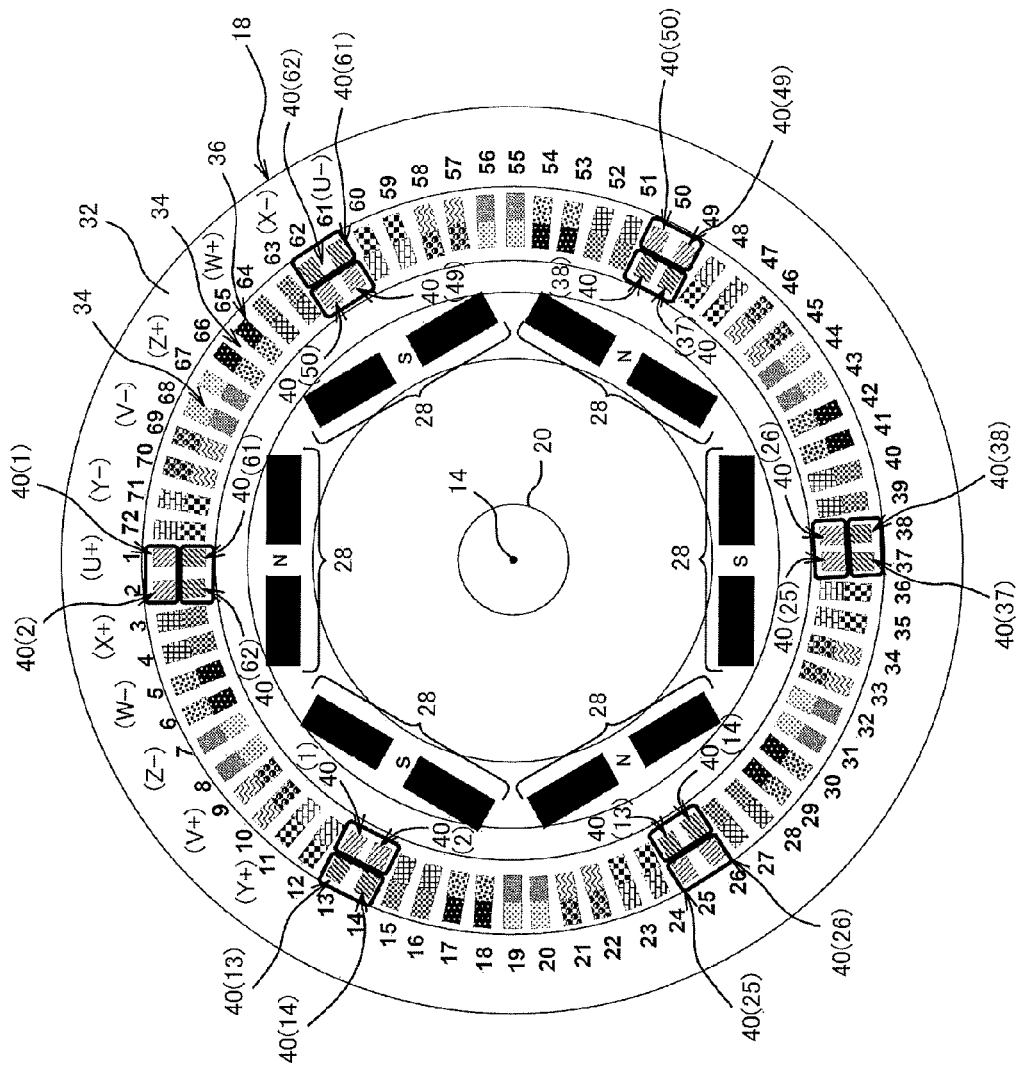
FIG. 2 is a cross-sectional view schematically showing a structural example of the superconducting rotating machine according to Embodiment 1 of the present invention.

FIG. 1 is a view showing an external appearance example and an internal structural example of a superconducting rotating machine according to Embodiment 1 of the present invention. FIG. 2 is a cross-sectional view schematically showing a configuration example of the superconducting rotating machine according to Embodiment 1 of the present invention. The superconducting rotating machine shown in FIG. 2 has six phases (e.g., a U phase, a V phase, a W phase, an X phase, a Y phase, and a Z phase), six poles (permanent magnet fields), and 72 slots. It is obvious that the number of phases and the number of poles of the superconducting rotating machine are arbitrary.

A superconducting rotating machine 10 shown in FIG. 1 has a radial gap structure in which a rotor 16 is made superconducting (superconducting field winding), and a stator 18 is made normal-conducting (normal conducting armature winding). The superconducting rotating machine 10 has a housing 12, the rotor 16 rotatably supported about a central axis 14 of the housing 12, and the stator 18 fixed to an inner wall of the housing 12 so as to surround a circumference of the rotor 16.

The rotor 16 has a rotor shaft 20 extending along the central axis 14 and rotatably supported by the housing 12. The rotor shaft 20 supports a rotor core 22, which is an inner cylindrical body with the central axis 14 as a center, and a casing 24, which is an outer cylindrical body. A tubular vacuum heat insulation space is constructed between the rotor core 22 and the casing 24, and in this vacuum heat insulation space, there are arranged non-iron-cored superconducting coils 28 constituting a plurality of magnetic pole pairs at regular intervals along a circumferential direction of the vacuum heat insulation space. In FIG. 2, arrangement of the superconducting coils 28 having three magnetic pole pairs as a case of six poles is shown. Moreover, in the rotor 16, although not illustrated, a cooling mechanism to cool the superconducting coils 28 arranged in the foregoing vacuum heat insulation space is provided. As a refrigerant used in this cooling mechanism to cool the superconducting coils 28, for example, helium gas can be employed. The rotor core 22 is preferably formed by cutting a forged material of a solid columnar body formed of a nonmagnetic material excellent in low-temperature characteristics, for example, SUS316. The casing 24 preferably includes one or a plurality of heat insulator layers excellent in heat insulation performance to low temperature.

The stator 18 has a tubular back yoke 32 fixed to an inner peripheral surface of the housing 12. The back yoke 32 is preferably formed by laminating a plurality of electromagnetic steel sheets (e.g., silicon steel sheets) extending in a direction orthogonal to the central axis 14. A plurality of teeth 34 disposed at regular intervals in the circumferential direction with the central axis 14 defined as a center are supported on the inner peripheral surface of the back yoke 32. Each of the teeth 34 extends toward the radially inner side of the stator 18 from the back yoke 32, and extends in a direction parallel to the central axis 14. Between the teeth 34 adjacent to one another in the circumferential direction of the stator 18, a slot 36 (a depressed groove) having a substantially rectangular cross section extending in a direction parallel to the central axis 14 is formed.

The teeth 34 are formed of a nonmagnetic material, for example, a rigid resin material having a high mechanical strength such as fiber reinforced plastic (FRP). Besides this, the teeth 34 may be formed of a nonmagnetic metal, for example, stainless steel. The teeth 34 may be formed by laminating a lot of thin sheets in the direction parallel to the central axis 14. In this manner, forming the teeth 34 of the nonmagnetic material can prevent an eddy current from being generated inside the teeth 34 by a movement of a magnetic field accompanying rotation of the rotor 16, and with this, a cooling mechanism of the teeth 34 can be unnecessary. Moreover, concentration of the magnetic flux on radially inner end portions (end portions opposed to the rotor 16) of the teeth 34 can be avoided.

In each of the slots 36, a slot number for identifying each one is given for descriptive purposes for facilitating understanding. FIG. 2 shows a method of giving the slot numbers when the number of slots is 72. In each of the slots 36, in a radially outer side region and a radially inner side region of the stator 18, an in-phase unit winding pair of the stator winding 40 is arranged, the detail of which will be described later. When seen from one end in the axial direction of the stator 18, one end (a starting end) of the unit winding pair appears in the radially outer side region and the other end (a terminal end) of the unit winding pair appears in the radially inner side region. Accordingly, a total number of the unit windings of the stator winding 40 is 72, that is, the same as the number of the slots. Hereinafter, the unit windings of the stator winding 40 disposed in the respective slots 36 will be identified, using reference numerals 40(1), 40(2), . . . , 40(72), and the respective slots 36 will be described, using reference numerals 36(1), 36(2), . . . , 36(72).

Figure 3:
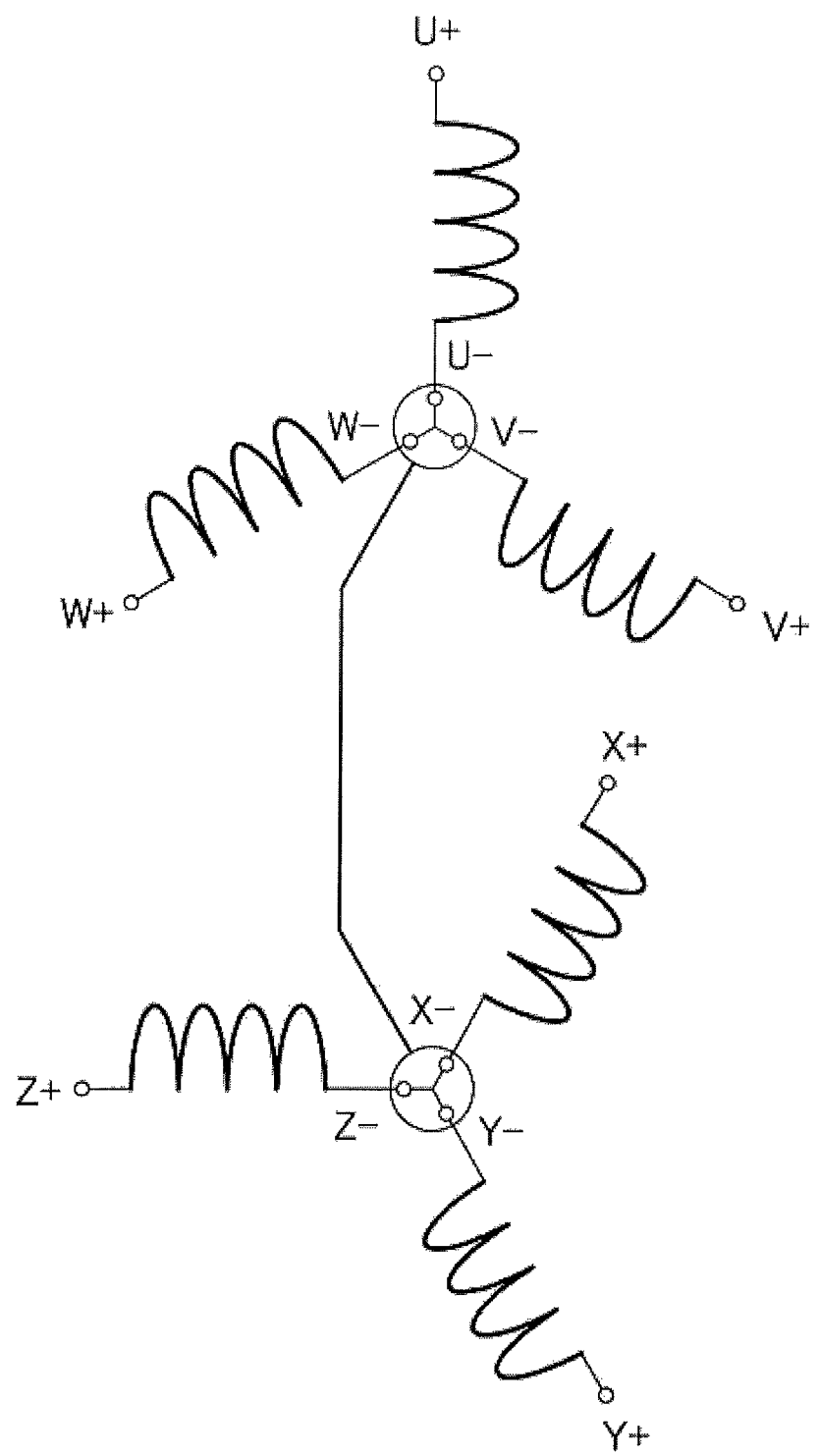
FIG. 3 is a connection diagram showing a configuration example of a stator winding shown in FIG. 2.

FIG. 3 is a connection diagram showing a configuration example of the stator winding 40 shown in FIG. 2. As shown in FIG. 3, the stator winding 40 has first Y (star) connection composed of a U-phase winding, a V-phase winding, and a W-phase winding, which are different from one another by 120° in phase, and second Y (star) connection composed of an X-phase winding, a Y-phase winding, and a Z-phase winding, which are different from one another by 120° in phase and is arranged so that the phase is shifted by 60° from the respective phase windings of the first Y connection, and further, a neutral point of the first Y connection and a neutral point of the second Y connection are connected to each other. Here, an external connection end and a neutral-point connection end out of both ends of the U phase winding are respectively represented by U+ and U−, an external connection end and a neutral-point connection end out of both ends of the V phase winding are respectively represented by V+ and V−, and an external connection end and a neutral-point connection end out of both ends of the W phase winding are respectively represented by W+ and W−. Similarly, an external connection end and a neutral-point connection end out of both ends of the X phase winding are respectively represented by X+ and X−, an external connection end and a neutral-point connection end out of both ends of the Y phase winding are respectively represented by Y+ and Y−, and an external connection end and a neutral-point connection end out of both ends of the Z phase winding are respectively represented by Z+ and Z−. Accordingly, the neutral-point connection ends U−, V−, W−, X−, Y−, and Z− are commonly connected.

Figure 4A:
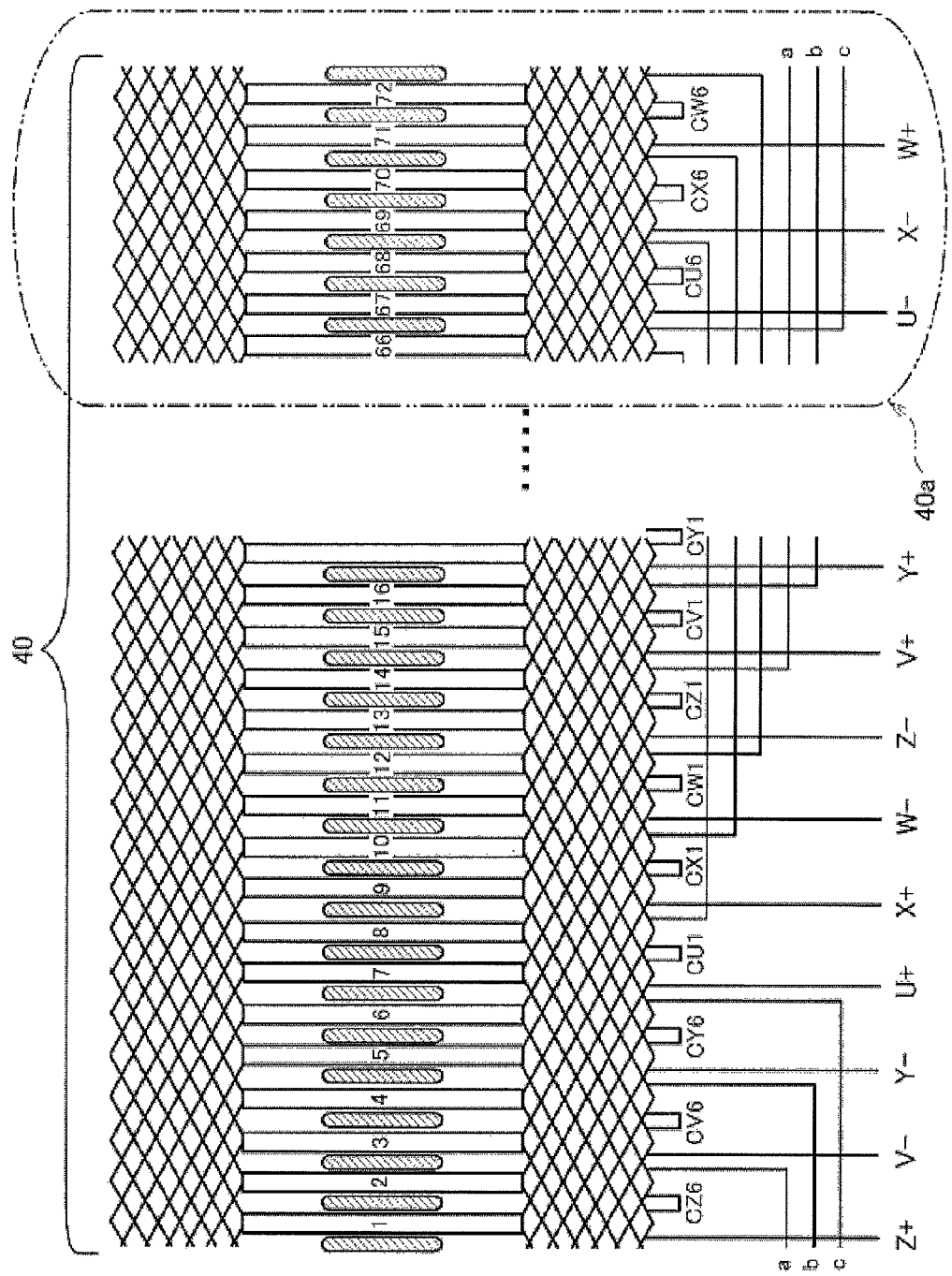
FIG. 4A is a schematic diagram showing a connection example of each phase winding constituting the stator winding shown in FIG. 3.
Figure 4B:
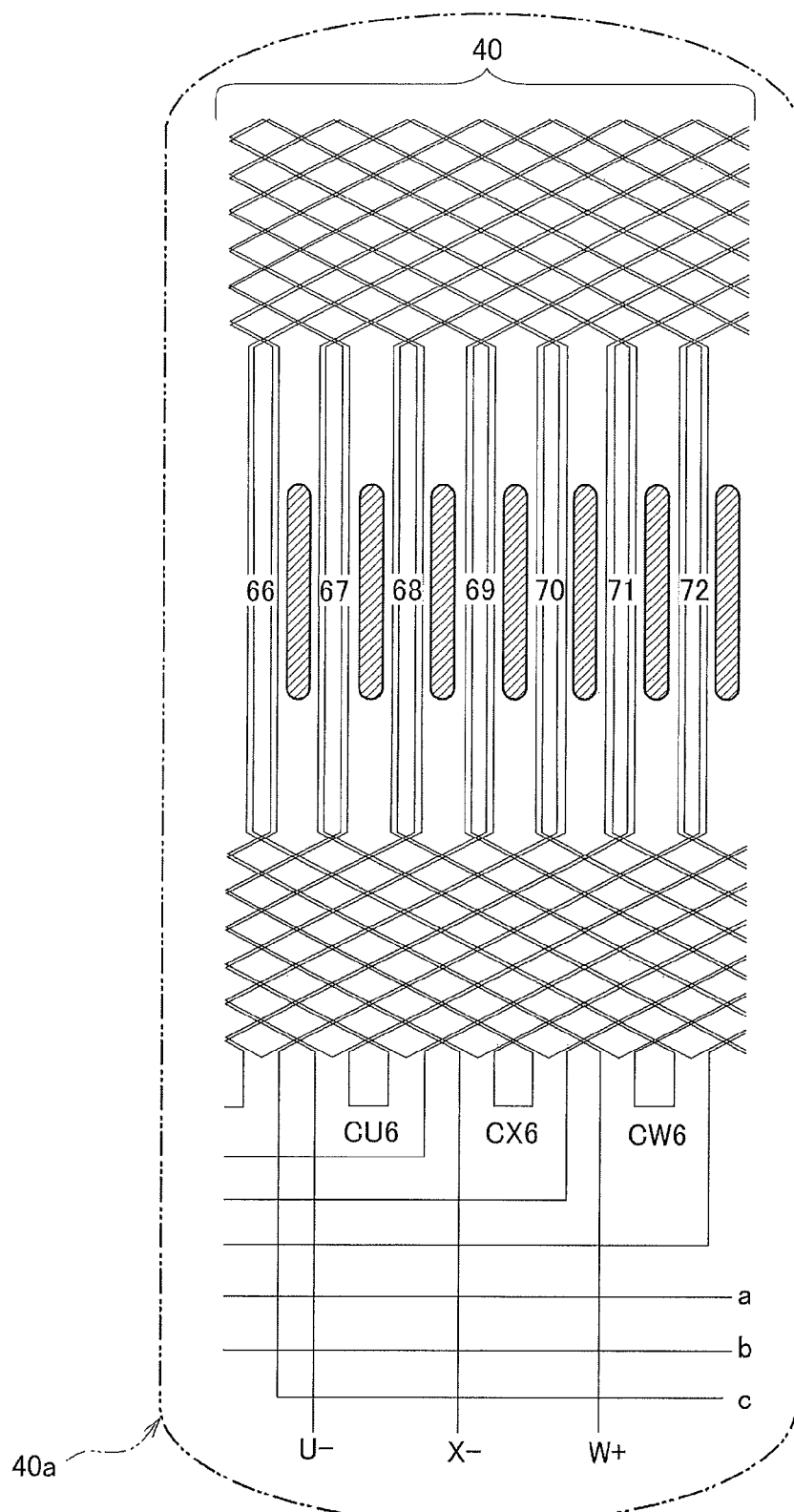
FIG. 4B is a diagram showing a part of the connection examples of the respective phase windings shown in FIG. 4A as enlarged.

FIG. 4A is a schematic diagram showing connection examples of the respective phase windings constituting the stator winding 40 shown in FIG. 3. FIG. 4B is a diagram showing a part of the connection examples of the respective phase windings shown in FIG. 4A as enlarged. The numbers 1 to 72 shown in FIG. 4A represent slot numbers. Since the neutral point of the first Y connection and the neutral point of the second Y connection are connected after the respective phase windings constituting the stator winding 40 are disposed, a number of lead wires led with the respective phase windings being arranged is 12 (U+, U−, V+, V−, W+, W−, X+, X−, Y+, Y−, Z+, and Z−). In the description below, as for both annular axial end faces of the stator 18 opposite to each other in the axial center direction of the stator 18, one axial end face from which 12 lead wires are led is referred to as "lead-wire side" or "connection side", while the other axial end face from which 12 lead wires are not led is referred to as "non-lead-wire side" or "non-connection side".

The connection of the U-phase winding in the stator winding 40 shown in FIG. 4A will be described with reference to FIG. 2.

The U-phase winding is arranged in the slot pairs of serial numbers adjacent to each other, the slot pairs appearing at intervals of 12 slots. Specifically, the U-phase winding is arranged in the respective slots 36(1), 36(2), 36(13), 36(14), 36(25), 36(27), 36(37), 36(38), 36(49), 36(50), 36(61), and 36(62) of the slot numbers 1, 2, 13, 14, 25, 26, 37, 38, 49, 50, 61, and 62. That is, the U-phase winding is composed of 12 unit windings 40(1), 40(2), 40(13), 40(14), 40(25), 40(26), 40(37), 40(38), 40(49), 40(50), 40(61), and 40(62).

The unit winding 40(1) is disposed at the radially outer side region and circumferentially one side region of the slot 36(1) having the slot number 1, and one end (starting end) of this unit winding 40(1) appears at the lead-wire side of the slot 36(1). It is to be noted that the external connection end U+ is extracted from one end of the unit winding 40(1). The unit winding 40(1) disposed at the radially outer side region and circumferentially one side region of the slot 36(1) is turned back as being turned over from outside to inside in the radial direction at the non-lead-wire side as described later, and disposed as turned back at the radially inner side region and circumferentially one side region of the slot 36(13) with the slot number 13. The unit winding 40(1) disposed as turned back at the radially inner side region and circumferentially one side region of the slot 36(13) is further turned back as being turned over from the other side to one side in the circumferential direction at the lead-wire side as described later, and disposed as turned back at the radially outer side region and circumferentially other side region of the slot 36(1). The unit winding 40(1) disposed as turned back at the radially outer side region and circumferentially other side region of the slot 36(1) is further turned back as being turned over from outside to inside in the radial direction as described later, and disposed as turned back at the radially inner side region and circumferentially other side region of the slot 36(13). As a result, the other end (terminal end) of the unit winding 40(1) appears at the lead-wire side at the radially inner side region and circumferentially other side region of the slot 36(13).

The unit winding 40(2) is disposed at the radially outer side region and circumferentially one side region of the slot 36(2) having the slot number 2, and one end (starting end) of this unit winding 40(2) appears at the lead-wire side of the slot 36(2). The unit winding 40(2) disposed at the radially outer side region and circumferentially one side region of the slot 36(2) is turned back as being turned over from outside to inside in the radial direction at the non-lead-wire side as described later, and disposed as turned back at the radially inner side region and circumferentially one side region of the slot 36(14) with the slot number 14. The unit winding 40(2) disposed as turned back at the radially inner side region and circumferentially one side region of the slot 36(14) is further turned back as being turned over from the other side to one side in the circumferential direction at the lead-wire side as described later, and disposed as turned back at the radially outer side region and circumferentially other side region of the slot 36(2). The unit winding 40(2) disposed as turned back at the slot 36(2) is further turned back as being turned over from outside to inside in the radial direction as described later, and disposed as turned back at the radially inner side region and circumferentially other side region of the slot 36(14). As a result, the other end (terminal end) of the unit winding 40(2) appears at the lead-wire side at the radially inner side region and circumferentially other side region of the slot 36(14).

The unit winding 40(13) is disposed at the radially outer side region and circumferentially one side region of the slot 36(13) having the slot number 13, and one end (starting end) of this unit winding 40(13) appears at the lead-wire side of the slot 36(13). The unit winding 40(13) disposed at the radially outer side region and circumferentially one side region of the slot 36(13) is turned back as being turned over from outside to inside in the radial direction at the non-lead-wire side as described later, and disposed as turned back at the radially inner side region and circumferentially one side region of the slot 36(25) with the slot number 25. The unit winding 40(13) disposed as turned back at the radially inner side region and circumferentially one side region of the slot 36(25) is further turned back as being turned over from the other side to one side in the circumferential direction at the lead-wire side as described later, and disposed as turned back at the radially outer side region and circumferentially other side region of the slot 36(13). The unit winding 40(13) disposed as turned back at the radially outer side region and circumferentially other side region of the slot 36(13) is further turned back as being turned over from outside to inside in the radial direction as described later, and disposed as turned back at the radially inner side region and circumferentially other side region of the slot 36(25). As a result, the other end (terminal end) of the unit winding 40(13) appears at the lead-wire side at the radially inner side region and circumferentially other side region of the slot 36(25).

The unit winding 40(14) is disposed at the radially outer side region and circumferentially one side region of the slot 36(14) having the slot number 14, and one end (starting end) of this unit winding 40(14) appears at the lead-wire side of the slot 36(14). The unit winding 40(14) disposed at the radially outer side region and circumferentially one side region of the slot 36(14) is turned back as being turned over from outside to inside in the radial direction at the non-lead-wire side as described later, and disposed as turned back at the radially inner side region and circumferentially one side region of the slot 36(26) with the slot number 26. The unit winding 40(14) disposed as turned back at the radially inner side region and circumferentially one side region of the slot 36(26) is further turned back as being turned over from the other side to one side in the circumferential direction at the lead-wire side as described later, and disposed as turned back at the radially outer side region and circumferentially other side region of the slot 36(14). The unit winding 40(14) disposed as turned back at the radially outer side region and circumferentially other side region of the slot 36(14) is further turned back as being turned over from outside to inside in the radial direction as described later, and disposed as turned back at the radially inner side region and circumferentially other side region of the slot 36(26). As a result, the other end (terminal end) of the unit winding 40(14) appears at the lead-wire side at the radially inner side region and circumferentially other side region of the slot 36(26).

The unit winding 40(25) is disposed at the radially outer side region and circumferentially one side region of the slot 36(25) having the slot number 25, and one end (starting end) of this unit winding 40(25) appears at the lead-wire side of the slot 36(25). The unit winding 40(25) disposed at the radially outer side region and circumferentially one side region of the slot 36(25) is turned back as being turned over from outside to inside in the radial direction at the non-lead-wire side as described later, and disposed at the radially inner side region and circumferentially one side region of the slot 36(37) with the slot number 37. The unit winding 40(25) disposed at the radially inner side region and circumferentially one side region of the slot 36(37) is further turned back as being turned over from the other side to one side in the circumferential direction at the lead-wire side as described later, and disposed at the radially outer side region and circumferentially other side region of the slot 36(25). The unit winding 40(25) disposed at the radially outer side region and circumferentially other side region of the slot 36(25) is further turned back as being turned over from outside to inside in the radial direction as described later, and disposed at the radially inner side region and circumferentially other side region of the slot 36(37). As a result, the other end (terminal end) of the unit winding 40(25) appears at the lead-wire side at the radially inner side region and circumferentially other side region of the slot 36(37).

The unit winding 40(26) is disposed at the radially outer side region and circumferentially one side region of the slot 36(26) having the slot number 26, and one end (starting end) of this unit winding 40(26) appears at the lead-wire side of the slot 36(26). The unit winding 40(26) disposed at the radially outer side region and circumferentially one side region of the slot 36(26) is turned back as being turned over from outside to inside in the radial direction at the non-lead-wire side as described later, and disposed at the radially inner side region and circumferentially one side region of the slot 36(38) with the slot number 38. The unit winding 40(26) disposed at the radially inner side region and circumferentially one side region of the slot 36(38) is further turned back as being turned over from the other side to one side in the circumferential direction at the lead-wire side as described later, and disposed at the radially outer side region and circumferentially other side region of the slot 36(26). The unit winding 40(26) disposed at the radially outer side region and circumferentially other side region of the slot 36(26) is further turned back as being turned over from outside to inside in the radial direction as described later, and disposed at the radially inner side region and circumferentially other side region of the slot 36(38). As a result, the other end (terminal end) of the unit winding 40(26) appears at the lead-wire side at the radially inner side region and circumferentially other side region of the slot 36(38).

The unit winding 40(37) is disposed at the radially outer side region and circumferentially one side region of the slot 36(37) having the slot number 37, and one end (starting end) of this unit winding 40(37) appears at the lead-wire side of the slot 36(49). The unit winding 40(37) disposed at the radially outer side region and circumferentially one side region of the slot 36(37) is turned back as being turned over from outside to inside in the radial direction at the non-lead-wire side as described later, and disposed at the radially inner side region and circumferentially one side region of the slot 36(49) with the slot number 49. The unit winding 40(37) disposed at the radially inner side region and circumferentially one side region of the slot 36(49) is further turned back as being turned over from one side and the other side in the circumferential direction at the lead-wire side as described later, and disposed at the radially outer side region and circumferentially other side region of the slot 36(37). The unit winding 40(37) disposed at the radially outer side region and circumferentially other side region of the slot 36(37) is further turned back as being turned over from outside to inside in the radial direction as described later, and disposed at the radially inner side region and circumferentially other side region of the slot 36(49). As a result, the other end (terminal end) of the unit winding 40(37) appears at the lead-wire side at the radially inner side region and circumferentially other side region of the slot 36(49).

The unit winding 40(38) is disposed at the radially outer side region and circumferentially one side region of the slot 36(38) having the slot number 38, and one end (starting end) of this unit winding 40(38) appears at the lead-wire side of the slot 36(38). The unit winding 40(38) disposed at the radially outer side region and circumferentially one side region of the slot 36(38) is turned back as being turned over from outside to inside in the radial direction at the non-lead-wire side as described later, and disposed at the radially inner side region and circumferentially one side region of the slot 36(50) with the slot number 50. The unit winding 40(38) disposed at the radially inner side region and circumferentially one side region of the slot 36(50) is further turned back as being turned over from the other side to one side in the circumferential direction at the lead-wire side as described later, and disposed at the radially outer side region and circumferentially other side region of the slot 36(38). The unit winding 40(38) disposed at the radially outer side region and circumferentially other side region of the slot 36(38) is further turned back as being turned over from outside to inside in the radial direction as described later, and disposed at the radially inner side region and circumferentially other side region of the slot 36(50). As a result, the other end (terminal end) of the unit winding 40(38) appears at the lead-wire side at the radially inner side region and circumferentially other side region of the slot 36(50).

The unit winding 40(49) is disposed at the radially outer side region and circumferentially one side region of the slot 36(49) having the slot number 49, and one end (starting end) of this unit winding 40(49) appears at the lead-wire side of the slot 36(49). The unit winding 40(49) disposed at the radially outer side region and circumferentially one side region of the slot 36(49) is turned back as being turned over from outside to inside in the radial direction at the non-lead-wire side as described later, and disposed at the radially inner side region and circumferentially one side region of the slot 36(61) with the slot number 61. The unit winding 40(49) disposed at the radially inner side region and circumferentially one side region of the slot 36(61) is further turned back as being turned over from the other side to one side in the circumferential direction at the lead-wire side as described later, and disposed at the radially outer side region and circumferentially other side region of the slot 36(49). The unit winding 40(49) disposed at the radially outer side region and circumferentially other side region of the slot 36(49) is further turned back as being turned over from outside to inside in the radial direction as described later, and disposed at the radially inner side region and circumferentially other side region of the slot 36(61). As a result, the other end (terminal end) of the unit winding 40(49) appears at the lead-wire side at the radially inner side region and circumferentially other side region of the slot 36(61). It is to be noted that the external connection end U− is extracted from the other end of the unit winding 40(49).

The unit winding 40(50) is disposed at the radially outer side region and circumferentially one side region of the slot 36(50) having the slot number 50, and one end (starting end) of this unit winding 40(50) appears at the lead-wire side of the slot 36(50). The unit winding 40(50) disposed at the radially outer side region and circumferentially one side region of the slot 36(50) is turned back as being turned over from outside to inside in the radial direction at the non-lead-wire side as described later, and disposed at the radially inner side region and circumferentially one side region of the slot 36(62) with the slot number 62. The unit winding 40(50) disposed at the radially inner side region and circumferentially one side region of the slot 36(62) is further turned back as being turned over from the other side to one side in the circumferential direction at the lead-wire side as described later, and disposed at the radially outer side region and circumferentially other side region of the slot 36(50). The unit winding 40(50) disposed at the radially outer side region and circumferentially other side region of the slot 36(50) is further turned back as being turned over from outside to inside in the radial direction as described later, and disposed at the radially inner side region and circumferentially other side region of the slot 36(62). As a result, the other end (terminal end) of the unit winding 40(50) appears at the lead-wire side at the radially inner side region and circumferentially other side region of the slot 36(62).

The unit winding 40(61) is disposed at the radially outer side region and circumferentially one side region of the slot 36(61) having the slot number 61, and one end (starting end) of this unit winding 40(61) appears at the lead-wire side of the slot 36(61). The unit winding 40(61) disposed at the radially outer side region and circumferentially one side region of the slot 36(61) is turned back as being turned over from outside to inside in the radial direction at the non-lead-wire side as described later, and disposed at the radially inner side region and circumferentially one side region of the slot 36(1) with the slot number 1. The unit winding 40(61) disposed at the radially inner side region and circumferentially one side region of the slot 36(1) is further turned back as being turned over from the other side to one side in the circumferential direction at the lead-wire side as described later, and disposed at the radially outer side region and circumferentially other side region of the slot 36(61). The unit winding 40(61) disposed at the radially outer side region and circumferentially other side region of the slot 36(61) is further turned back as being turned over from outside to inside in the radial direction as described later, and disposed at the radially inner side region and circumferentially other side region of the slot 36(1). As a result, the other end (terminal end) of the unit winding 40(61) appears at the lead-wire side at the radially inner side region and circumferentially other side region of the slot 36(1).

The unit winding 40(62) is disposed at the radially outer side region and circumferentially one side region of the slot 36(62) having the slot number 62, and one end (starting end) of this unit winding 40(62) appears at the lead-wire side of the slot 36(62). The unit winding 40(62) disposed at the radially outer side region and circumferentially one side region of the slot 36(62) is turned back as being turned over from outside to inside in the radial direction at the non-lead-wire side as described later, and disposed at the radially inner side region and circumferentially one side region of the slot 36(2) with the slot number 2. The unit winding 40(62) disposed at the radially inner side region and circumferentially one side region of the slot 36(2) is further turned back as being turned over from the other side to one side in the circumferential direction at the lead-wire side as described later, and disposed at the radially outer side region and circumferentially other side region of the slot 36(62). The unit winding 40(62) disposed at the radially outer side region and circumferentially other side region of the slot 36(62) is further turned back as being turned over from outside to inside in the radial direction as described later, and disposed at the radially inner side region and circumferentially other side region of the slot 36(2). As a result, the other end (terminal end) of the unit winding 40(62) appears at the lead-wire side at the radially inner side region and circumferentially other side region of the slot 36(2).

Summarizing the above, the starting end and the terminal end of the unit winding 40(1) appear respectively at the radially outer side region of the slot 36(1) and at the radially inner side region of the slot 36(13) at the lead-wire side of the stator 18. The starting end and the terminal end of the unit winding 40(2) appear respectively at the radially outer side region of the slot 36(2) and at the radially inner side region of the slot 36(14). The starting end and the terminal end of the unit winding 40(13) appear respectively at the radially outer side region of the slot 36(13) and at the radially inner side region of the slot 36(25). The starting end and the terminal end of the unit winding 40(14) appear respectively at the radially outer side region of the slot 36(14) and at the radially inner side region of the slot 36(26). The starting end and the terminal end of the unit winding 40(25) appear respectively at the radially outer side region of the slot 36(25) and at the radially inner side region of the slot 36(37). The starting end and the terminal end of the unit winding 40(26) appear respectively at the radially outer side region of the slot 36(26) and at the radially inner side region of the slot 36(38). The starting end and the terminal end of the unit winding 40(37) appear respectively at the radially outer side region of the slot 36(37) and at the radially inner side region of the slot 36(49). The starting end and the terminal end of the unit winding 40(38) appear respectively at the radially outer side region of the slot 36(38) and at the radially inner side region of the slot 36(50). The starting end and the terminal end of the unit winding 40(49) appear respectively at the radially outer side region of the slot 36(49) and at the radially inner side region of the slot 36(61). The starting end and the terminal end of the unit winding 40(50) appear respectively at the radially outer side region of the slot 36(50) and at the radially inner side region of the slot 36(62). The starting end and the terminal end of the unit winding 40(61) appear respectively at the radially outer side region of the slot 36(61) and at the radially inner side region of the slot 36(1). The starting end and the terminal end of the unit winding 40(62) appear respectively at the radially outer side region of the slot 36(62) and at the radially inner side region of the slot 36(2).

The unit windings 40(1), 40(2), 40(13), 40(14), 40(25), 40(26), 40(37), 40(38), 40(49), 40(50), 40(61), and 40(62) are connected in series. Specifically, the terminal end of the unit winding 40(1) appearing in the slot 36(13) is connected to the starting end of the unit winding 40(2) appearing in the slot 36(2). The terminal end of the unit winding 40(2) appearing in the slot 36(14) is connected to the starting end of the unit winding 40(13) appearing in the slot 36(13). The terminal end of the unit winding (13) appearing in the slot 36(25) is connected to the starting end of the unit winding 40(14) appearing in the slot 36(14). The terminal end of the unit winding 40(14) appearing in the slot 36(26) is connected to the starting end of the unit winding 40(25) appearing in the slot 36(25). The terminal end of the unit winding 40(25) appearing in the slot 36(37) is connected to the starting end of the unit winding 40(26) appearing in the slot 36(26). The terminal end of the unit winding 40(26) appearing in the slot 36(38) is connected to the starting end of the unit winding 40(37) appearing in the slot 36(37). The terminal end of the unit winding 40(37) appearing in the slot 36(49) is connected to the starting end of the unit winding 40(38) appearing in the slot 36(38). The terminal end of the unit winding 40(38) appearing in the slot 36(50) is connected to the starting end of the unit winding 40(49) appearing in the slot 36(49). The terminal end of the unit winding 40(49) appearing in the slot 36(61) is connected to the starting end of the unit winding 40(50) appearing in the slot 36(50). The terminal end of the unit winding 40(50) appearing in the slot 36(62) is connected to the starting end of the unit winding 40(61) appearing in the slot 36(61). The terminal end of the unit winding 40(61) appearing in the slot 36(1) is connected to the starting end of the unit winding 40(62) appearing in the slot 36(62).

CU1 shown in FIG. 4A represents the inter-coil connection between the above unit winding 40(1) and the unit winding 40(2), and CU6 shown in FIG. 4A represents an inter-coil connection between the above unit winding 40(49) and the unit winding 40(50). Besides that, the inter-coil connection between the unit winding 40(2) and the unit winding 40(25) is represented as CU2, the inter-coil connection between the unit winding 40(25) and the unit winding 40(26) is represented as CU3, the inter-coil connection between the unit winding 40(26) and the unit winding 40(49) is represented as CU4, and the inter-coil connection between the unit winding 40(49) and the unit winding 40(50) is represented as CU5.

The connection example of the U phase winding has been described above. The similar connection is applied for the other phase windings, which are the V phase winding, W phase winding, X phase winding, Y phase winding, and Z phase winding. Notably, CV1, . . . , CV6 represent inter-coil connections in the V phase winding, CW1, . . . , CW6 represent inter-coil connections in the W phase winding, CX1, . . . , CX6 represent inter-coil connections in the X phase winding, CY1, . . . , CY6 represent inter-coil connections in the Y phase winding, and CZ1, . . . , CZ6 represent inter-coil connections in the Z phase winding.

[Configuration Example of Stator Winding]

Figure 5A:
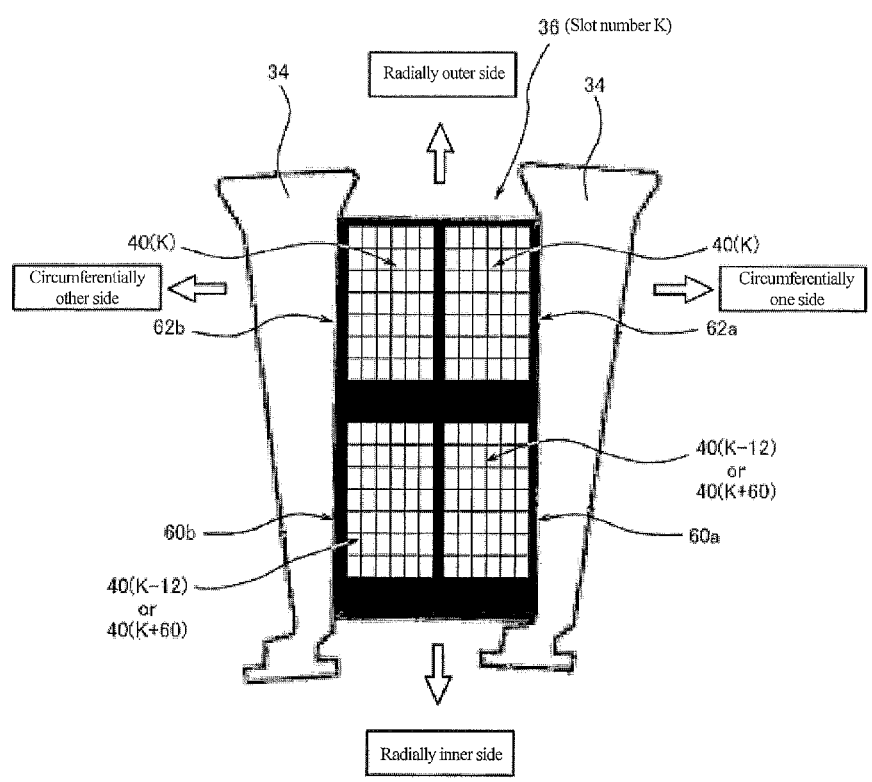
FIG. 5A is one example of a sectional view of teeth adjacent to each other shown in FIG. 2 and a stator winding disposed in a slot between these teeth.
Figure 5B:
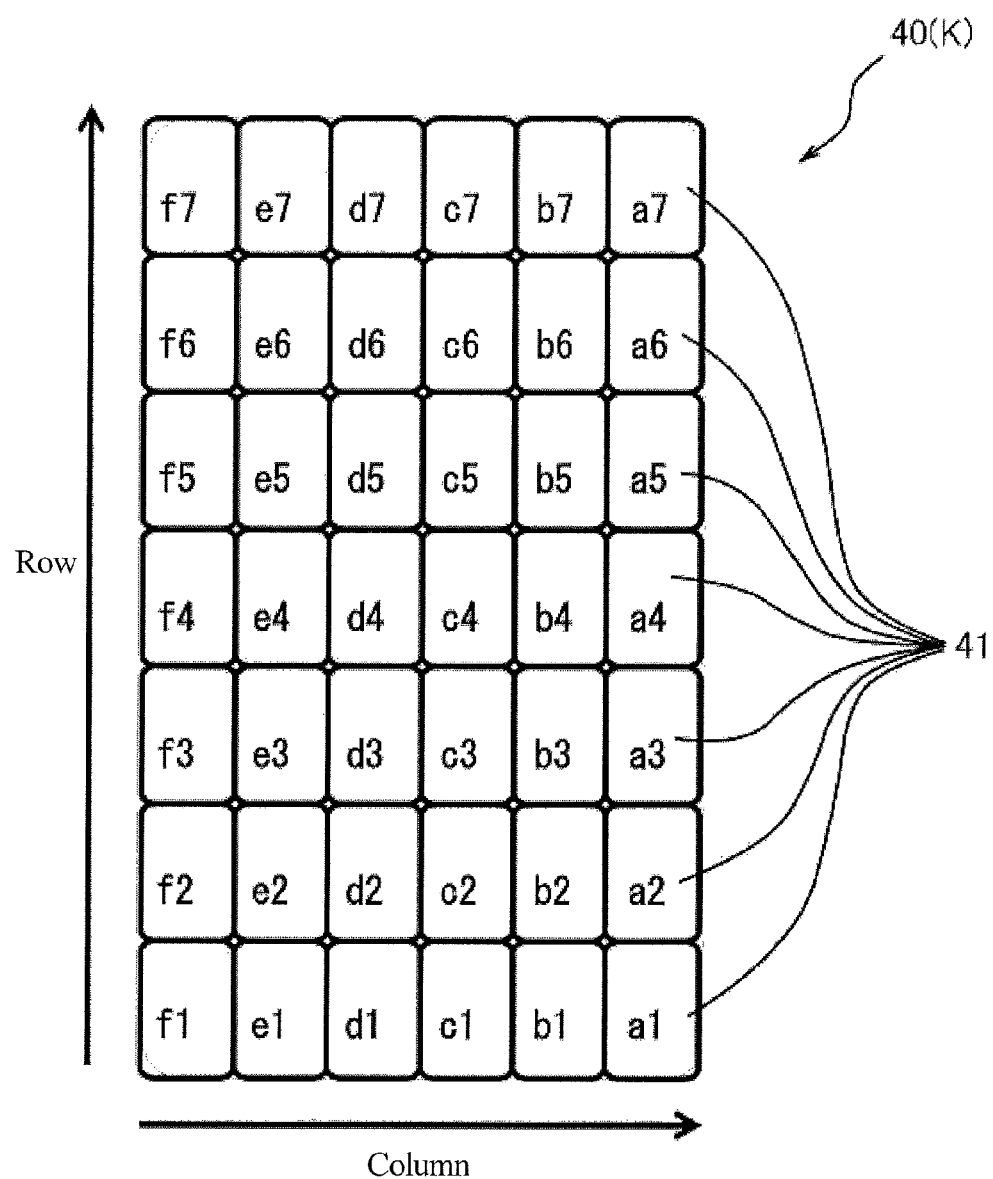
FIG. 5B is one example of a sectional view of a unit winding shown in FIG. 5A.

FIG. 5A is one example of a sectional view of the teeth 34 adjacent to each other shown in FIG. 2 and the stator winding 40 disposed in the slot 36 formed between these teeth 34. FIG. 5B is one example of a sectional view of a unit winding 40(K) shown in FIG. 5A.

As shown in FIG. 5A, the slot 36 with a slot number K (1<K<72) set between the adjacent teeth 34 has cuboid regions (62a, 62b, 60a, 60b) as arrangement regions of the stator winding 40. Each of the cuboid regions has a rectangular cross-sectional shape having a pair of long sides along the radial direction of the stator 18 and a pair of short sides along the circumferential direction of the stator 18. The cuboid regions (62a, 62b, 60a, 60b) are sectioned into the radially outer side regions (62a, 62b) and the radially inner side regions (60a, 60b) of the stator 18. Further, the radially outer side regions (62a, 62b) are sectioned into a circumferentially one side (clockwise side) region 62a (first sectional region) and the circumferentially other side (counterclockwise side) region 62b (second sectional region) as viewed in the radial direction of the stator 18. Similarly, the radially inner side regions (60a, 60b) are sectioned into a circumferentially one side region 60a (third sectional region) and the circumferentially other side region 60b (fourth sectional region) as viewed in the radial direction of the stator 18. The unit winding 40(K) that is a part of a certain phase winding of the stator winding 40 arranged in the slot 36 with the slot number K is turned back and disposed at the radially outer side regions (62a, 62b), while the unit winding 40(K−12) (in the case of K>12) or the unit winding 40 (K+60) (in the case of K<12), which is a part of the same phase winding as the unit winding 40(K), is turned back and disposed at the radially inner side regions (60a, 60b).

As shown in FIG. 5B, the unit winding 40(K) shown in FIG. 5A has a plurality of insulating conductor strands 41, which are bundled with an appropriate member (not shown in the figure) in such a manner that rectangular cross sections of the plurality of insulating conductor strands 41 are arranged in a matrix. In the present embodiment described below, the plurality of insulating conductor strands 41 of the unit winding 40 are bundled in such a manner that the rectangular cross sections of the plurality of insulating conductor strands 41 are arranged in a matrix. However, they may not be regularly arranged in a matrix, but may randomly (irregularly) be arranged in a bundle. In other words, it is only enough that the bundle of the insulating conductor strands 41 are not twisted in the unit winding 40.

A row direction shown in FIG. 5B corresponds to the radial direction of the stator 18, while a column direction shown in FIG. 5B corresponds to the circumferential direction of the stator 18. The example shown in FIG. 5B illustrates the cross section of the unit winding 40(K) formed by arraying 42 insulating conductor strands 41 in 7 rows and 6 columns. For the descriptive purposes, assuming that a start end of the unit winding 40(K) is reference, numbers 1 to 7 serving as row identifiers are given to the row components of the respective insulating conductor strands 41 in ascending order from the radially inner side to the radially outer side of the stator 18, and small alphabets a to f serving as column identifiers are given to the column components of the respective insulating conductor strands 41 in ascending order from the circumferentially one side to the circumferentially other side of the stator 18. Therefore, the row components of the respective insulating conductor strands 41 are {(a1,b1,c1,d1,e1,f1),(a2,b2,c2,d2,e2,f2),(a3,b3,c3,d3, e3,f3),(a4,b4,c4,d4,e4,f4),(a5,b5,c5,d5,e5,f5),(a6,b6,c6,d6, e6,f6),(a7,b7,c7,d7,e7,f7)}.

The insulating conductor strand 41 is composed of a strand conductor and an insulating material covering the outer periphery of the strand conductor. The insulating conductor strand 41 is electrically insulated from the other insulating conductor strands 41 by the insulating material. Each of the insulating conductor strands 41 is a flat conductor wire with a rectangular cross section having a pair of long sides along the row direction and a pair of short sides along the column direction. When such a flat conductor wire is used for the insulating conductor strands 41, the unit winding 40(K) is segmented to suppress the in-strand eddy current, and the density of the unit winding 40(K) disposed at the radially outer side regions (62a, 62b) and the radially inner side regions (60a, 60b) with the rectangular cross section is increased. The cross section of the insulating conductor strand 41 is not limited to a rectangle, but may be various shapes such as a square, a circle, or a triangle. From the viewpoint of increasing density, the shape of the cross section of the insulating conductor strand 41 is preferably a quadrilateral such as a rectangle or a square.

Figure 6:
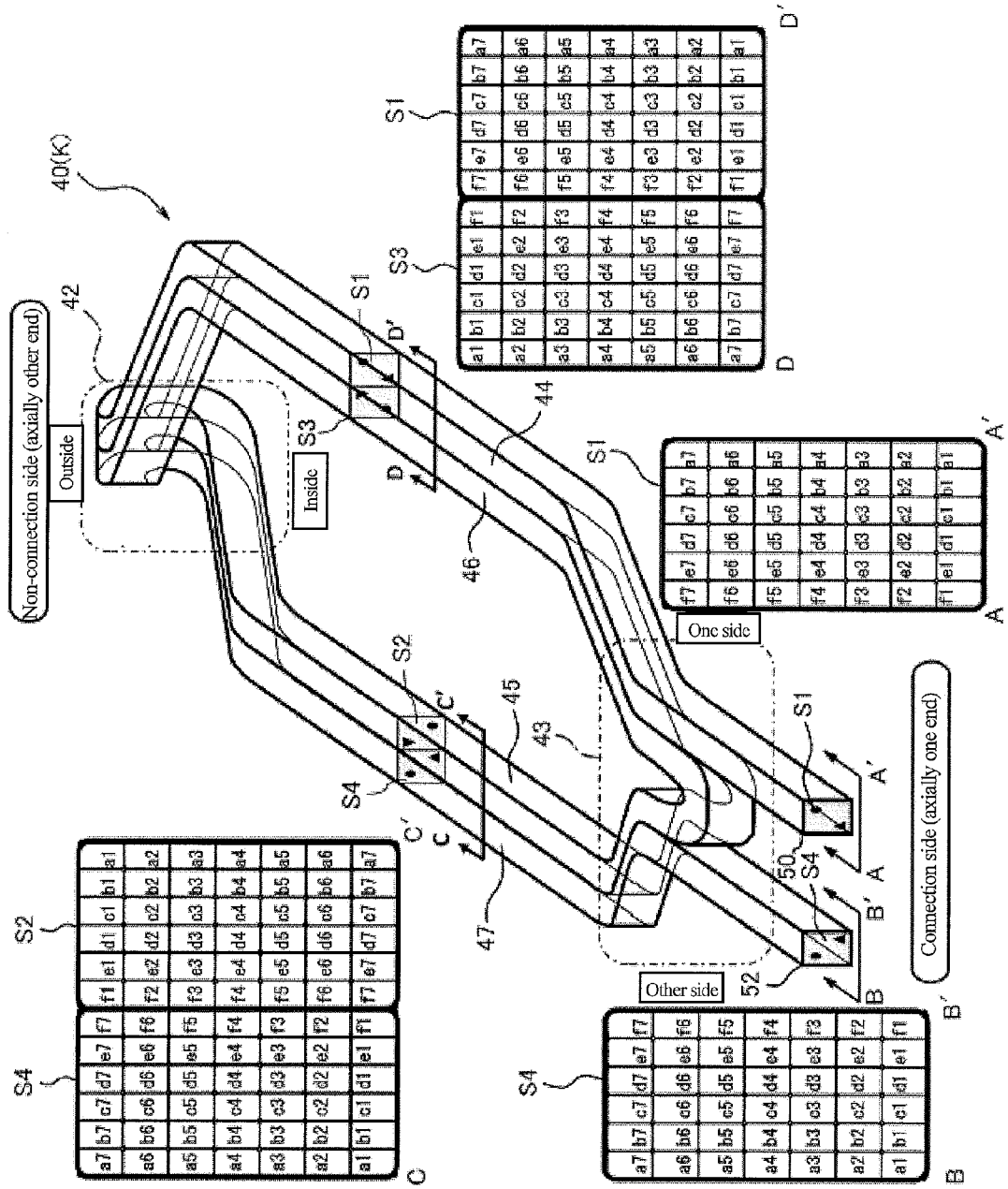
FIG. 6 is one example of a perspective view of the unit winding shown in FIG. 5A, a sectional view of the unit winding taken along a line A-A', a sectional view taken along a line B-B', a sectional view taken along a line C-C', and a sectional view taken along a line D-D'.

FIG. 6 is one example of a perspective view of the unit winding 40(K) shown in FIG. 5A, a sectional view of the unit winding 40(K) taken along a line A-A', a sectional view taken along a line B-B', a sectional view taken along a line C-C', and a sectional view taken along a line D-D'.

A starting end 50 of the unit winding 40(K) has a cross section S1 along the line A-A' viewed from the connection side, and a terminal end 52 of the unit winding 40(K) has a cross section S4 along the line B-B' viewed from the connection side.

Firstly, the unit winding 40(K) is disposed to be introduced from the connection side and drawn from the non-connection side. Here, the linear portion of the unit winding 40(K) from the starting end 50 toward the non-connection side is referred to as a starting-end-side linear portion 44.

Then, the positions on the rows and columns of each insulating conductor strand 41 are inverted in the radial direction from inside to outside and from outside to inside at a radial-direction inversion portion 42 at the non-connection side. The unit winding 40(K) thus turned over is disposed as turned back so as to be introduced from the non-connection side and drawn from the connection side. Here, the linear portion directing toward the connection side from the non-connection side in the first turnback (hereinafter referred to as "first turn") at the radial-direction inversion portion 42 is referred to as a terminal-end-side linear portion 45.

Then, the positions on the rows and columns of each insulating conductor strand 41 are inverted in the circumferential direction from one side to the other side and from the other side to one side at a circumferential-direction inversion portion 43 at the connection side. The unit winding 40(K) thus turned over is disposed as turned back so as to be introduced from the connection side and drawn from the non-connection side in order that it is disposed to be adjacent to the inner side (left side) of the starting-end-side linear portion 44 directing from the connection side toward the non-connection side in the first turn. Here, the linear portion directing toward the non-connection side from the connection side by the turnback at the circumferential-direction inversion portion 43 is referred to as a starting-end-side adjacently-disposed linear portion 46.

Then, the positions on the rows and columns of each insulating conductor strand 41 are inverted in the radial direction from inside to outside and from outside to inside again at the radial-direction inversion portion 42 at the non-connection side. The unit winding 40(K) thus turned over is disposed as turned back so as to be introduced from the non-connection side and drawn from the connection side in order that it is disposed to be adjacent to the outer side (left side) of the terminal-end-side linear portion 45 directing from the non-connection side toward the connection side in the first turn. Here, the linear portion directing toward the connection side from the non-connection side in the second turnback (hereinafter referred to as "second turn") at the radial-direction inversion portion 42 is referred to as a terminal-end-side adjacently-disposed linear portion 47.

The cross section of the starting-end-side linear portion 44 along the D-D' line viewed from the connection side is the same as the cross section S1 of the starting end 50. On the other hand, the cross section of the starting-end-side adjacently-disposed linear portion 46 along the D-D' line viewed from the connection side is a cross section S3 in which the positions on the rows and columns of each insulating conductor strand 41 constituting the cross section S1 of the starting end 50 are inverted in the radial direction from inside to outside and from outside to inside and also inverted in the circumferential direction from the other side to one side and from the other side to one side. Therefore, each insulating conductor strand 41 constituting the cross section S1 and each insulating conductor strand 41 constituting the cross section S3 are in a positional relation of point symmetry.

The cross section of the terminal-end-side linear portion 45 along the C-C' line as viewed from the connection side is a cross section S2 in which the positions on the rows and columns of each insulating conductor strand 41 forming the cross section S1 of the starting end 50 are turned over from inside to outside in the radial direction. On the other hand, the cross section of the terminal-end-side adjacently-disposed linear portion 47 along the C-C' line as viewed from the connection side is a cross section S4 in which the positions on the rows and columns of each insulating conductor strand 41 constituting the cross section S1 of the starting end 50 are inverted in the radial direction from inside to outside and from outside to inside and also inverted in the circumferential direction from the other side to one side and from the other side to one side. Therefore, each insulating conductor strand 41 constituting the cross section S2 and each insulating conductor strand 41 constituting the cross section S4 are in a positional relation of point symmetry.

Figure 7:
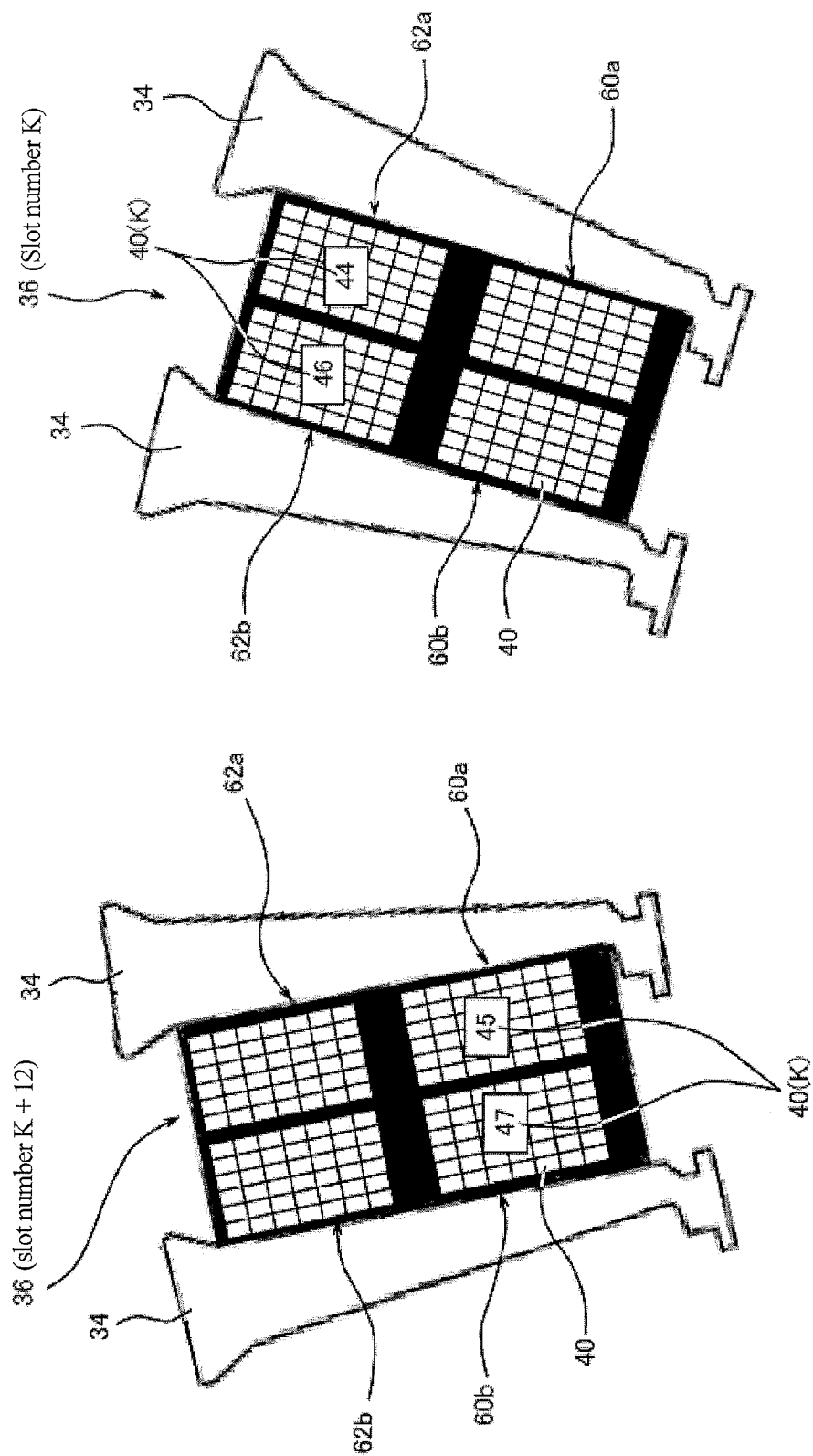
FIG. 7 is a view for describing examples of an arrangement of the unit winding shown in FIG. 6 in the slot.

FIG. 7 is a view for describing examples of an arrangement of the unit winding 40(K) shown in FIG. 6 in the slot. As shown in FIG. 7, the starting-end-side linear portion 44 is disposed in the radially outer side region and circumferentially one side region 62a of the slot 36 with the slot number "K", while the starting-end-side adjacently-disposed linear portion 46 is disposed in the radially outer side region and circumferentially other side region 62b of the slot 36 with the slot number "K". The terminal-end-side linear portion 45 is disposed in the radially inner side region and circumferentially one side region 60a of the slot 36 with the slot number "K+12", while the terminal-end-side adjacently-disposed linear portion 47 is disposed in the radially inner side region and circumferentially other side region 60b.

[Change in Magnetic Flux Passing Through Each Slot]

As apparent from FIG. 13, the direction of the magnetic flux (lines of magnetic force) passing through each slot (and the unit winding disposed in each slot) is changed with the rotation of the rotor. The magnetic flux passes through the slots opposite to the magnetic poles of the rotor in almost the radial direction of the stator. On the other hand, the magnetic flux passes through the slots opposite to the regions between the magnetic poles of the rotor in almost the circumferential direction of the stator.

[Inter-Strand Circulating Eddy Current of Row Component in Unit Winding in First Turn]

Figure 8:
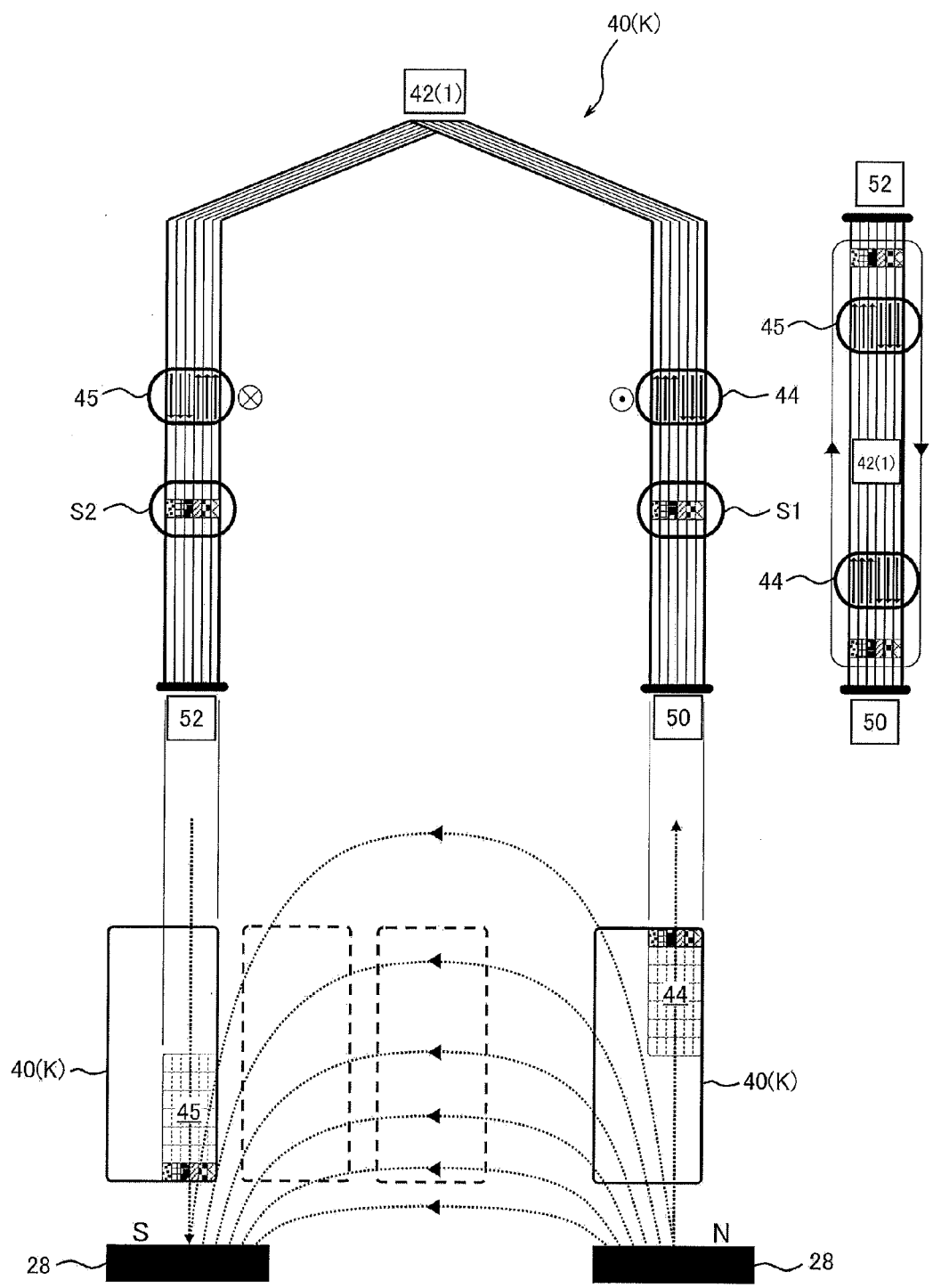
FIG. 8 is a view for describing an inter-strand circulating eddy current of row components of the unit winding, shown in FIG. 6, in the first turn.

FIG. 8 is a view for describing an inter-strand circulating eddy current of a row component in the unit winding 40(K), shown in FIG. 6, in the first turn, and specifically, FIG. 8 is a view for describing that an inter-strand circulating eddy current is emphasized by the first turn.

Firstly, it is supposed that the end of the starting-end-side linear portion 44 of the unit winding 40(K) at the starting end 50 and the end of the terminal-end-side linear portion 45 of the unit winding 40(K) at the terminal end 52 are short-circuited. It is also supposed that the magnetic flux from the radially inner side toward the radially outer side of the stator 18 passes through the row components of the starting-end-side linear portion 44, and the magnetic flux from the radially outer side toward the radially inner side of the stator 18 passes through the row components of the terminal-end-side linear portion 45. In other words, the slot to which the unit winding 40(K) is disposed is supposed to be opposite to the magnetic poles of the rotor.

Components (a7 to f7) on the seventh row at the end of the starting-end-side linear portion 44 will be described below as an example.

Since the unit winding 40(K) is turned over once from outside to inside in the radial direction at the radial-direction inversion portion 42, the components (a7 to f7) on the seventh row of the starting-end-side linear portion 44 are associated with the components on the first row of the terminal-end-side linear portion 45.

In the starting-end-side linear portion 44, an inter-strand circulating eddy current is generated so as to cancel the change in the magnetic flux from the radially inner side toward the radially outer side of the stator 18. Notably, the direction of the eddy current among the insulating conductor strands at the components (a7, b7, and c7) of three columns in the circumferentially one side, out of the components (a7 to f7) on the seventh row, is a direction from the non-connection side toward the connection side, and the direction of the inter-strand circulating eddy current at the components (d7, e7, and f7) of three columns in the circumferentially other side, out of the components (a7 to f7) on the seventh row, is a direction from the connection side toward the non-connection side In the terminal-end-side linear portion 45, an inter-strand circulating eddy current is generated so as to cancel the change in the magnetic flux from the radially outer side toward the radially inner side of the stator 18. Notably, the direction of the inter-strand circulating eddy current of the components (a7, b7, and c7) of three columns in the circumferentially one side, out of the components (a7 to f7) on the first row, is a direction from the connection side toward the non-connection side, and the direction of the inter-strand circulating eddy current of the components (d7, e7, and f7) of three columns in the circumferentially other side, out of the components (a7 to f7) on the first row, is a direction from the connection side toward the non-connection side A group of the components (a7, b7, and c7) of three columns in the circumferentially one side, out of the components (a7 to f7) on the seventh row of the starting-end-side linear portion 44, corresponds to a group of the components (a7, b7, and c7) of three columns in the circumferentially one side, out of the components (a7 to f7) on the first row of the terminal-end-side linear portion 45, and the directions of the inter-strand circulating eddy current of both groups are both the direction from the non-connection side toward the connection side.

A group of the components (d7, e7, and f7) of three columns in the circumferentially other side, out of the components (a7 to f7) on the seventh row of the starting-end-side linear portion 44, corresponds to a group of the components (d7, e7, and f7) of three columns in the circumferentially other side, out of the components (a7 to f7) on the first row of the terminal-end-side linear portion 45, and the directions of the inter-strand circulating eddy current of both groups are both the direction from the connection side toward the non-connection side.

This therefore means that the inter-strand circulating eddy current of the starting-end-side linear portion 44 and the inter-strand circulating eddy current of the terminal-end-side linear portion 45 flow in the mutually intensifying direction.

[Inter-Strand Circulating Eddy Current of Row Component in Unit Winding in Second Turn]

Figure 9:
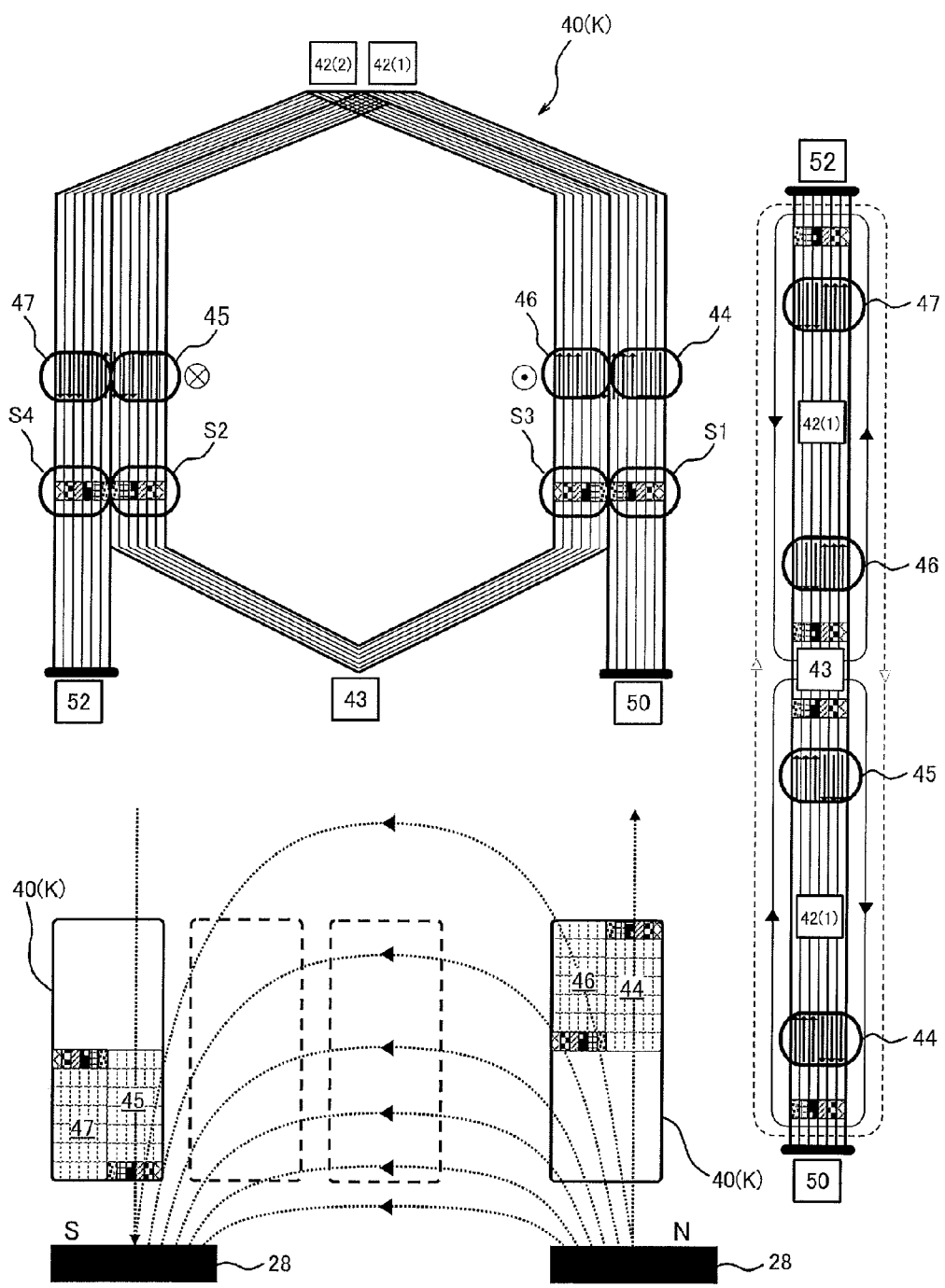
FIG. 9 is a view for describing an inter-strand circulating eddy current of row components of the unit winding, shown in FIG. 6, in the second turn.

FIG. 9 is a view for describing an inter-strand circulating eddy current of the row components of the unit winding 40(K), shown in FIG. 6, in the second turn. It is described below that the inter-strand circulating eddy current is canceled by the second turn with reference to FIG. 9.

Firstly, it is supposed that the end of the starting-end-side linear portion 44 of the unit winding 40(K) at the starting end 50 and the end of the terminal-end-side linear portion 45 of the unit winding 40(K) at the terminal end 52 are short-circuited, as in the first turn shown in FIG. 8. It is also supposed that the magnetic flux from the radially inner side toward the radially outer side of the stator 18 passes through the row components of the starting-end-side linear portion 44 and the starting-end-side adjacently-disposed linear portion 46, and the magnetic flux from the radially outer side toward the radially inner side of the stator 18 passes through the row components of the terminal-end-side linear portion 45 and the terminal-end-side adjacently-disposed linear portion 47. In other words, the slot to which the unit winding 40(K) is disposed is supposed to be opposite to the magnetic poles of the rotor.

Components (a7 to f7) on the seventh row at the end of the starting-end-side linear portion 44 will be described below as an example.

The unit winding 40(K) is turned over twice from outside to inside in the radial direction at the radial-direction inversion portion 42, and is turned over once from the other side to one side in the circumferential direction at the circumferential-direction inversion portion 43. With this, the components (a7 to f7) on the seventh row of the starting-end-side linear portion 44 are associated with the components (a7 to f7) on the first row of the terminal-end-side linear portion 45, the components (f7 to a7) on the first row of the starting-end-side adjacently-disposed linear portion 46, and the components (f7 to a7) on the seventh row of the terminal-end-side adjacently-disposed linear portion 47.

In the starting-end-side linear portion 44, an inter-strand circulating eddy current is generated so as to cancel the change in the magnetic flux from the radially inner side toward the radially outer side of the stator 18. Notably, the direction of the eddy current among the insulating conductor strands at the components (a7, b7, and c7) of three columns in the circumferentially one side, out of the components (a7 to f7) on the seventh row, is a direction from the non-connection side toward the connection side, and the direction of the inter-strand circulating eddy current at the components (d7, e7, and f7) of three columns in the circumferentially other side, out of the components (a7 to f7) on the seventh row, is a direction from the connection side toward the non-connection side In the starting-end-side adjacently-disposed linear portion 46, an inter-strand circulating eddy current is generated so as to cancel the change in the magnetic flux from the radially inner side toward the radially outer side of the stator 18, as in the starting-end-side linear portion 44. Notably, the direction of the eddy current among the insulating conductor strands at the components (f7, e7, and d7) of three columns in the circumferentially one side, out of the components (f7 to a7) on the first row, is a direction from the non-connection side toward the connection side, and the direction of the inter-strand circulating eddy current at the components (c7, b7, and a7) of three columns in the circumferentially other side, out of the components (f7 to a7) on the first row, is a direction from the connection side toward the non-connection side With this, the direction of the inter-strand circulating eddy current of the same components between the components (a7 to f7) on the seventh row of the starting-end-side linear portion 44 and the components (f7 to a7) on the first row of the starting-end-side adjacently-disposed linear portion 46 is reverse to each other. Therefore, the inter-strand circulating eddy current of the starting-end-side linear portion 44 and the inter-strand circulating eddy current of the starting-end-side adjacently-disposed linear portion 46 are in a relation of being canceled with each other.

In the terminal-end-side linear portion 45, an inter-strand circulating eddy current is generated so as to cancel the change in the magnetic flux from the radially outer side toward the radially inner side of the stator 18. Notably, the direction of the inter-strand circulating eddy current of the components (a7, b7, and c7) of three columns in the circumferentially one side, out of the components (a7 to f7) on the first row, is a direction from the connection side toward the non-connection side, and the direction of the inter-strand circulating eddy current of the components (d7, e7, and f7) of three columns in the circumferentially other side, out of the components (a7 to f7) on the first row, is a direction from the connection side toward the non-connection side In the terminal-end-side adjacently-disposed linear portion 47, an inter-strand circulating eddy current is generated so as to cancel the change in the magnetic flux from the radially outer side toward the radially inner side of the stator 18, as in the terminal-end-side linear portion 45. Notably, the direction of the inter-strand circulating eddy current of the components (f7, e7, and d7) of three columns in the circumferentially one side, out of the components (f7 to a7) on the seventh row, is a direction from the connection side toward the non-connection side, and the direction of the inter-strand circulating eddy current of the components (c7, b7, and a7) of three columns in the circumferentially other side, out of the components (f7 to a7) on the seventh row, is a direction from the connection side toward the non-connection side.

With this, the direction of the inter-strand circulating eddy current of the same components between the components (a7 to f7) on the first row of the terminal-end-side linear portion 45 and the components (f7 to a7) on the first row of the terminal-end-side adjacently-disposed linear portion 47 is reverse to each other. Therefore, the inter-strand circulating eddy current of the terminal-end-side linear portion 45 and the inter-strand circulating eddy current of the terminal-end-side adjacently-disposed linear portion 47 are in a relation of being canceled with each other.

[Inter-Strand Circulating Eddy Current of Column Component in Unit Winding in First Turn]

Figure 10:
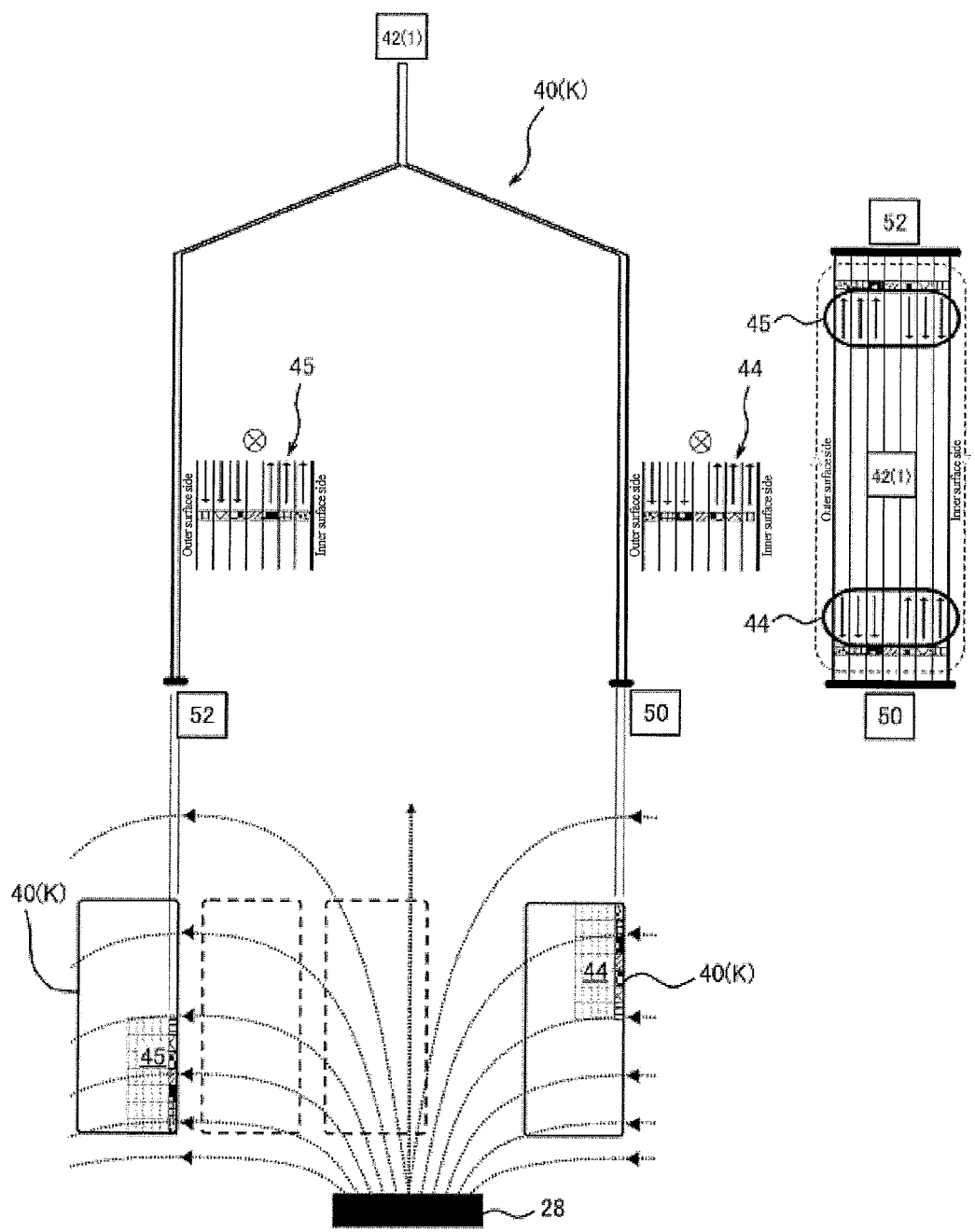
FIG. 10 is a view for describing an inter-strand circulating eddy current of column components of the unit winding, shown in FIG. 6, in the first turn.

FIG. 10 is a view for describing an inter-strand circulating eddy current of the column components of the unit winding 40(K), shown in FIG. 6, in the first turn.

Firstly, it is supposed that the end (each insulating conductor strand 41) of the starting-end-side linear portion 44 of the unit winding 40(K) at the starting end 50 and the end (each insulating conductor strand 41) of the terminal-end-side linear portion 45 of the unit winding 40(K) at the terminal end 52 are short-circuited. It is also supposed that the magnetic flux from the circumferentially one side toward the circumferentially other side of the stator 18 passes through the column components of the starting-end-side linear portion 44, and the magnetic flux from the circumferentially one side toward the circumferentially other side of the stator 18 passes through the column components of the terminal-end-side linear portion 45. In other words, the slot to which the unit winding 40(K) is disposed is supposed to be opposite to the region between the magnetic poles of the rotor.

Components (a1 to a7) on the first column at the end of the starting-end-side linear portion 44 will be described below as an example.

Since the unit winding 40(K) is turned over once from outside to inside in the radial direction at the radial-direction inversion portion 42, the components (a1 to a7) on the first column of the starting-end-side linear portion 44 are associated with the components (a7 to a1) on the first column of the terminal-end-side linear portion 45.

In the starting-end-side linear portion 44, an inter-strand circulating eddy current is generated so as to cancel the change in the magnetic flux from the circumferentially one side toward the circumferentially other side of the stator 18. Notably, the direction of the eddy current among the insulating conductor strands at the components (a5, a6, and a7) of three rows in the radially outer side, out of the components (a1 to a7) on the first column, is a direction from the non-connection side toward the connection side, and the direction of the inter-strand circulating eddy current at the components (a1, a2, and a3) of three rows in the radially inner side, out of the components (a1 to a7) on the first row, is a direction from the connection side toward the non-connection side.

In the terminal-end-side linear portion 45, an inter-strand circulating eddy current is generated so as to cancel the change in the magnetic flux from the circumferentially one side toward the circumferentially other side of the stator 18. Notably, the direction of the inter-strand circulating eddy current at the components (a3, a2, and a1) of three rows in the radially outer side, out of the components (a7 to a1) on the first column, is a direction from the non-connection side toward the connection side, and the direction of the inter-strand circulating eddy current at the components (a7, a6, and a5) of three rows in the radially inner side, out of the components (a7 to a1) on the first column, is a direction from the connection side toward the non-connection side.

With this, a group of the components (a5, a6, and a7) of three rows in the radially outer side, out of the components (a1 to a7) on the first column of the starting-end-side linear portion 44, corresponds to a group of the components (a7, a6, and a5) of three rows in the radially inner side, out of the components (a7 to a1) on the first column of the terminal-end-side linear portion 45. Therefore, the directions of the inter-strand circulating eddy currents of both groups are reverse to each other, so that a relation in which the inter-strand circulating eddy currents of both groups are canceled with each other is established.

Similarly, a group of the components (a1, a2, and a3) of three rows in the radially inner side, out of the components (a1 to a7) on the first column of the starting-end-side linear portion 44, corresponds to a group of the components (a3, a2, and a1) of three rows in the radially outer side, out of the components (a7 to a1) on the first column of the terminal-end-side linear portion 45. Therefore, the directions of the inter-strand circulating eddy currents of both groups are reverse to each other, so that a relation in which the inter-strand circulating eddy currents of both groups are canceled with each other is established.

Figure 11:
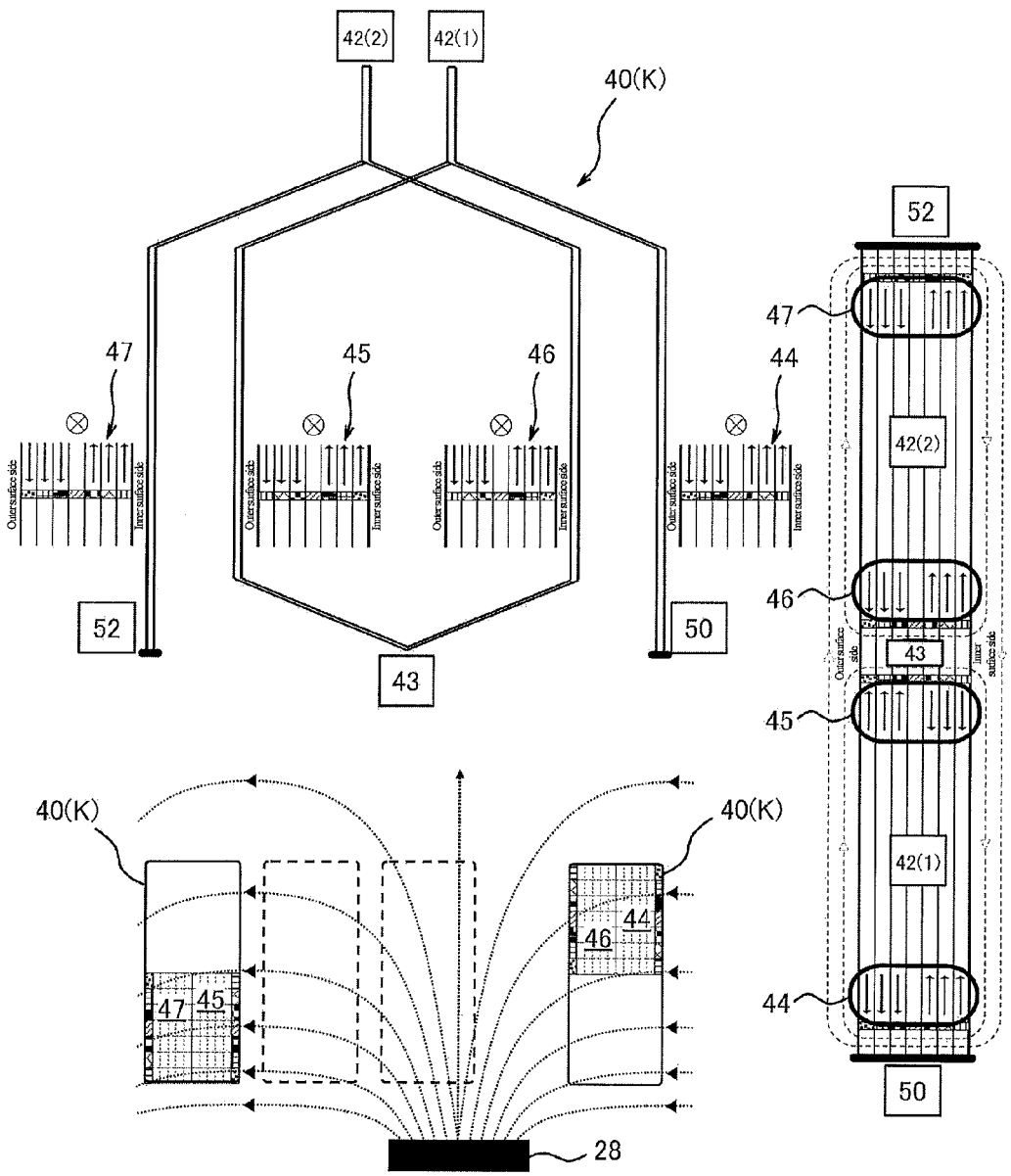
FIG. 11 is a view for describing an inter-strand circulating eddy current of column components of the unit winding, shown in FIG. 6, in the second turn.

[Inter-Strand Circulating eddy current of column component in unit winding in second turn] FIG. 11 is a view for describing an inter-strand circulating eddy current of the column components of the unit winding 40(K), shown in FIG. 6, in the second turn.

Firstly, it is supposed that the end (each insulating conductor strand 41) of the starting-end-side linear portion 44 of the unit winding 40(K) at the starting end 50 and the end (each insulating conductor strand 41) of the terminal-end-side linear portion 45 of the unit winding 40(K) at the terminal end 52 are short-circuited. It is also supposed that the magnetic flux from the circumferentially one side toward the circumferentially other side of the stator 18 passes through the column components of the starting-end-side linear portion 44 and the starting-end-side adjacently-disposed linear portion 46, and the magnetic flux from the circumferentially one side toward the circumferentially other side of the stator 18 passes through the column components of the terminal-end-side linear portion 45 and the terminal-end-side adjacently-disposed linear portion 47. In other words, the slot to which the unit winding 40(K) is disposed is supposed to be opposite to the region between the magnetic poles of the rotor.

Components (a1 to a7) on the first column at the end of the starting-end-side linear portion 44 will be described below as an example.

The unit winding 40(K) is turned over twice from outside to inside in the radial direction at the radial-direction inversion portion 42, and is turned over once from the other side to one side in the circumferential direction at the circumferential-direction inversion portion 43. With this, the components (a1 to a7) on the first column of the starting-end-side linear portion 44 are associated with the components (a7 to a1) on the first column of the terminal-end-side linear portion 45, the components (a7 to a1) on the sixth column of the starting-end-side adjacently-disposed linear portion 46, and the components (a1 to a7) on the sixth column of the terminal-end-side adjacently-disposed linear portion 47.

In the starting-end-side linear portion 44, an inter-strand circulating eddy current is generated so as to cancel the change in the magnetic flux from the circumferentially one side toward the circumferentially other side of the stator 18.

Notably, the direction of the eddy current among the insulating conductor strands at the components (a5, a6, and a7) of three rows in the radially outer side, out of the components (a1 to a7) on the first column, is a direction from the non-connection side toward the connection side, and the direction of the inter-strand circulating eddy current at the components (a1, a2, and a3) of three rows in the radially inner side, out of the components (a1 to a7) on the first column, is a direction from the connection side toward the non-connection side.

In the terminal-end-side linear portion 45, an inter-strand circulating eddy current is generated so as to cancel the change in the magnetic flux from the circumferentially one side toward the circumferentially other side of the stator 18. Notably, the direction of the inter-strand circulating eddy current at the components (a3, a2, and a1) of three rows in the radially outer side, out of the components (a7 to a1) on the first column, is a direction from the non-connection side toward the connection side, and the direction of the inter-strand circulating eddy current at the components (a7, a6, and a5) of three rows in the radially inner side, out of the components (a7 to a1) on the first column, is a direction from the connection side toward the non-connection side.

With this, a group of the components (a5, a6, and a7) of three rows in the radially outer side, out of the components (a1 to a7) on the first column of the starting-end-side linear portion 44, corresponds to a group of the components (a7, a6, and a5) of three rows in the radially inner side, out of the components (a7 to a1) on the first column of the terminal-end-side linear portion 45. Therefore, the directions of the inter-strand circulating eddy currents of both groups are reverse to each other, so that a relation in which the inter-strand circulating eddy currents of both groups are canceled with each other is established.

Similarly, a group of the components (a1, a2, and a3) of three rows in the radially inner side, out of the components (a1 to a7) on the first column of the starting-end-side linear portion 44, corresponds to a group of the components (a3, a2, and a1) of three rows in the radially outer side, out of the components (a7 to a1) on the first column of the terminal-end-side linear portion 45. Therefore, the directions of the inter-strand circulating eddy currents of both groups are reverse to each other, so that a relation in which the inter-strand circulating eddy currents of both groups are canceled with each other is established.

In the starting-end-side adjacently-disposed linear portion 46, an inter-strand circulating eddy current is generated so as to cancel the change in the magnetic flux from the circumferentially one side toward the circumferentially other side of the stator 18, as in the starting-end-side linear portion 44. Notably, the direction of the eddy current among the insulating conductor strands at the components (a3, a2, and a1) of three rows in the radially outer side, out of the components (a7 to a1) on the sixth column, is a direction from the non-connection side toward the connection side, and the direction of the inter-strand circulating eddy current at the components (a7, a6, and a5) of three rows in the radially inner side, out of the components (a7 to a1) on the sixth column, is a direction from the connection side toward the non-connection side.

In the terminal-end-side adjacently-disposed linear portion 47, an inter-strand circulating eddy current is generated so as to cancel the change in the magnetic flux from the circumferentially one side toward the circumferentially other side of the stator 18, as in the terminal-end-side linear portion 45. Notably, the direction of the inter-strand circulating eddy current at the components (a5, a6, and a7) of three rows in the radially outer side, out of the components (a1 to a7) on the sixth column, is a direction from the non-connection side toward the connection side, and the direction of the inter-strand circulating eddy current at the components (a1, a2, and a3) of three rows in the radially inner side, out of the components (a1 to a7) on the sixth column, is a direction from the connection side toward the non-connection side.

With this, a group of the components (a3, a2, and a1) of three rows in the radially outer side, out of the components (a7 to a1) on the sixth column of the starting-end-side adjacently-disposed linear portion 46 corresponds to a group of the components (a1, a2, and a3) of three rows in the radially inner side, out of the components (a1 to a7) on the sixth column of the terminal-end-side adjacently-disposed linear portion 47. Therefore, the directions of the inter-strand circulating eddy currents of both groups are reverse to each other, so that a relation in which the inter-strand circulating eddy currents of both groups are canceled with each other is established.

Similarly, a group of the components (a1, a2, and a3) of three rows in the radially inner side, out of the components (a7 to a1) on the sixth column of the starting-end-side adjacently-disposed linear portion 46 corresponds to a group of the components (a3, a2, and a1) of three rows in the radially outer side, out of the components (a1 to a7) on the sixth column of the terminal-end-side adjacently-disposed linear portion 47. Therefore, the directions of the inter-strand circulating eddy currents of both groups are reverse to each other, so that a relation in which the inter-strand circulating eddy currents of both groups are canceled with each other is established.

Embodiment 2

Embodiment 2 of the present invention is a winding manner in which plural insulating conductor strands are turned back only in such a manner that the positions of the plural insulating conductor strands constituting a unit winding are inverted in a circumferential direction of the stator from one side to the other side and from the other side to one side at a non-connection side. Embodiment 2 will be described with reference to FIGS. 7 and 8.

In Embodiment 1, each slot 36 of a stator 18 is sectioned into four sectional regions 62a, 62b, 60a, and 60b, as in two slots 36 shown in FIG. 7, each slot having a unit winding 40(K) disposed therein. On the other hand, in Embodiment 2, the slot 36 is only necessarily sectioned into a radially outer side region and a radially inner side region of the stator 18.

The unit winding 40(K) disposed in the radially outer side region of one slot 36 so as to be introduced from an axially one end of the stator 18 and drawn from an axially other end is turned back in such a manner that the positions of the plural insulating conductor strands 41 constituting the unit winding 40(K) are inverted in a circumferential direction of the stator 18 from one side to the other side and from the other side to one side at the axially other end.

The unit winding 40(K) turned back in the circumferential direction is disposed in the radially inner side region of the other slot 36 such that it is introduced from the axially other end and drawn from the axially one end. Specifically, the winding manner of the unit winding 40(K) in Embodiment 2 is such that the radial-direction inversion portion 42 at the non-connection side in the first turn shown in FIG. 8 is replaced by the circumferential-direction inversion portion 43. This winding manner of the unit winding 40(K) can cancel the inter-strand circulating eddy current involved with the row components, which are dominant for the eddy current, out of the row components and the column components of the unit winding 40(K) in which plural insulating conductor strands 41 are disposed in a matrix. Specifically, the positions of the plural insulating conductor strands 41 are inverted in the circumferential direction of the stator 18 from one side to the other side and from the other side to one side between a certain row component of the unit winding 40(K) disposed in one slot 36 at the linear portion of the unit winding 40(K) and the row component, which is the same row as the certain row component, of the unit winding 40(K) disposed in the other slot 36 at the linear portion of the unit winding 40(K).

Embodiment 3

Embodiment 3 according to the present invention relates to an "inter-coil connection" for suppressing an inter-strand circulating eddy current that cannot completely be canceled but remains by the winding manner (second turn) of a unit winding. Specifically, as shown in FIG. 5A, different unit windings 40 are respectively disposed at the radially outer side region (62a, 62b) and the radially inner side region (60a, 60b) in each slot 36. In the case of the winding manner in which the inter-coil connection of these different unit windings 40 is similar to that at the non-connection side, i.e., in the case where the inter-coil connection is performed in such a manner that the unit winding is turned over from inside to outside in the radial direction and not turned over from the other side to one side or one side to the other side in the circumferential direction, the inter-strand circulating eddy current that cannot completely be canceled but remains by the winding manner (second turn) of the unit winding 40 can be canceled.

Figure 12:
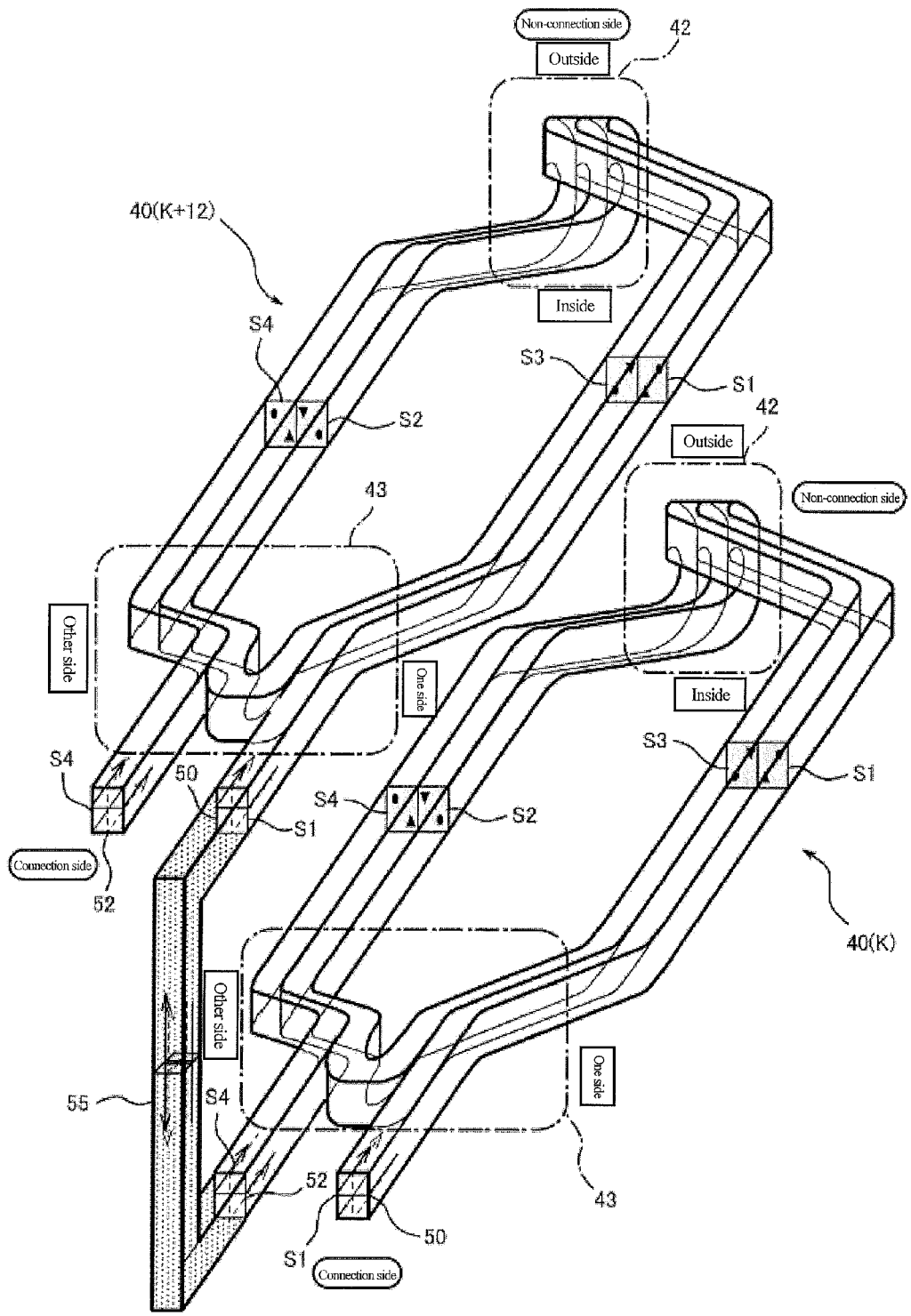
FIG. 12 is a view schematically showing one example of an inter-coil connection of the unit winding shown in FIG. 6.

FIG. 12 is a view schematically showing one example of an inter-coil connection based on the unit winding shown in FIG. 6. FIG. 12 shows one example of an inter-coil connection for connecting the unit winding 40(K) and the unit winding 40(K+12) via an inter-coil connection electric wire 55, the unit winding 40(K) and the unit winding 40(K+12) having the coil formation (coil winding) similar to the unit winding 40(K) shown in FIG. 6. Specifically, the terminal end 52 of the unit winding 40(K) and the starting end 50 of the unit winding 40(K+12) are electrically connected to each other via the inter-coil connection electric wire 55. Similar to the unit winding 40, the inter-coil connection electric wire 55 is composed of plural insulating conductor strands 41 arrayed in a matrix. The relation between the position of the insulating conductor strands 41 in the matrix arrangement of the starting end 50 and the position of the insulating conductor strands 41 in the matrix arrangement of the terminal end 52 is such that the inversion from inside to outside and from outside to inside in the radial direction is not performed, and the inversion from one side to the other side and from the other side to one side in the circumferential direction is performed.

FIG. 12 also shows an inter-strand circulating eddy current that cannot completely be canceled but remains only by the winding manner (second turn) of a unit winding 40 alone. Specifically, solid lines shown at the terminal end 52 of the unit winding 40(K), the starting end 50 of the unit winding 40(K+12), and the middle part of the inter-coil connection electric wire 55 indicate row inter-strand eddy current that cannot completely be canceled but remains only by the second turn in the unit winding 40(K) and the unit winding 40(K+12) respectively. Dotted lines shown at the terminal end 52 of the unit winding 40(K), the starting end 50 of the unit winding 40(K+12), and the middle part of the inter-coil connection electric wire 55 indicate column inter-strand eddy current that cannot completely be canceled but remains only by the second turn in the unit winding 40(K) and the unit winding 40(K+12) respectively. FIG. 12 shows a state in which the row inter-strand eddy current and the column inter-strand eddy current can be canceled at the middle part of the inter-coil connection electric wire 55.

As for an inter-pole connection for connecting a winding group opposite to one magnetic pole and a winding group opposite to the other magnetic pole, an inter-strand circulating eddy current that cannot completely be canceled but remains only by the winding manner of the unit winding 40 can be suppressed by the connection manner similar to the inter-coil connection described above.

From the foregoing description, many modifications and other embodiments of the present invention are obvious to those in the art. Accordingly, the foregoing description should be construed as only exemplification, and has been given to those in the art for the purpose of providing best aspects to carry out the present invention. Details of the structure and/or the function can be substantially changed without departing from the spirit of the present invention.

INDUSTRIAL APPLICABILITY

The present invention is useful for a radial gap type superconducting rotating machine in which a rotor is made superconducting, a stator is made normal-conducting, and a stator winding arranged in the stator is made air-cored.

REFERENCE SIGNS LIST 10 superconducting rotating machine
12 housing
14 central axis
16 rotor
18 stator
20 rotor shaft
22 rotor core
24 casing
28 superconducting coil
32 back yoke
34 teeth
36 slot
40 stator winding
40(1)~40(72) unit winding
41 insulating conductor strand
42 radial-direction inversion portion
43 circumferential-direction inversion portion
44 starting-end-side linear portion
45 terminal-end-side linear portion
55 inter-coil connection electric wire
46 starting-end-side adjacently-disposed linear portion
47 terminal-end-side adjacently-disposed linear portion
50 starting end
52 terminal end
60a circumferentially one side region
60b circumferentially other side region
62a circumferentially one side region
62b circumferentially other side region

The invention claimed is:
1. A stator of a superconducting rotating machine, the stator being disposed to surround a circumference of a rotor in which a plurality of field windings using a superconducting wire are disposed in a circumferential direction, and the stator having a plurality of unit windings constituting an air-cored stator winding disposed thereon, the stator comprising:

a plurality of teeth disposed on an inner circumference, opposite to the field windings of the rotor, in a circumferential direction; and a plurality of slots formed between the teeth adjacent to each other, wherein each of the slots is sectioned into a first sectional region that is a radially outer side and circumferentially one side of the stator as viewed from an axial direction, a second sectional region that is a radially outer side and circumferentially other side of the stator, a third sectional region that is a radially inner side and circumferentially one side of the stator, and a fourth sectional region that is a radially inner side and circumferentially other side of the stator, the unit winding includes a plurality of insulating conductor strands, and is formed by bundling the plurality of insulating conductor strands, and for a first slot and a second slot, which are apart from each other by a predetermined slot number, out of the plurality of slots, the unit winding disposed to be introduced from one end in an axial direction of the stator into the first sectional region of the first slot and to be drawn from the other end in the axial direction is turned back in such a manner that radial positions of the plurality of insulating conductor strands constituting the unit winding are inverted, the unit winding turned back in the radial direction is disposed so as to be introduced into the third sectional region of the second slot from the other end in the axial direction and to be drawn from the one end in the axial direction, and is turned back in such a manner that the circumferential positions of the plurality of insulating conductor strands constituting the unit winding are inverted, the unit winding turned back in the circumferential direction is disposed so as to be introduced into the second sectional region of the first slot from the one end in the axial direction and to be drawn from the other end in the axial direction, and is turned back in such a manner that radial positions of the plurality of insulating conductor strands constituting the unit winding are inverted, and the unit winding turned back in the radial direction is disposed so as to be introduced into the fourth sectional region of the second slot from the other end in the axial direction and to be drawn from the one end in the axial direction.

2. A stator of a superconducting rotating machine according to claim 1, wherein in one of unit windings and another unit winding connected in series, a terminal end of one of unit windings and a starting end of the other unit winding are connected at the one end in the axial direction via an electric wire that is turned back similarly to the other end in the axial direction.

3. The stator of a superconducting rotating machine according to claim 1, wherein the unit winding is formed by bundling the plurality of insulating conductor strands such that a rectangular cross section of each of the plurality of insulating conductor strands is disposed in a matrix.

4. A superconducting rotating machine comprising the stator according to claim 1.

5. A stator of a superconducting rotating machine, the stator being disposed to surround a circumference of a rotor in which a plurality of field windings using a superconducting wire are disposed in a circumferential direction, and the stator having a plurality of unit windings constituting an air-cored stator winding disposed thereon, the stator comprising:

a plurality of teeth disposed on an inner circumference, opposite to the field windings of the rotor, in a circumferential direction; and a plurality of slots formed between the teeth adjacent to each other, wherein each of the slots is sectioned into a radially outer side region and a radially inner side region of the stator, the unit winding includes a plurality of insulating conductor strands, and is formed by bundling the plurality of insulating conductor strands, and for a first slot and a second slot, which are apart from each other by a predetermined slot number, out of the plurality of slots, the unit winding disposed to be introduced from one end in an axial direction of the stator into the radially outer side region of the first slot and to be drawn from the other end in the axial direction is turned back in such a manner that the circumferential positions of the plurality of insulating conductor strands constituting the unit winding are inverted, and the unit winding turned back in the circumferential direction is disposed so as to be introduced into the radially inner side region of the second slot from the other end in the axial direction and to be drawn from the one end in the axial direction.

6. The stator of a superconducting rotating machine according to claim 5, wherein the unit winding is formed by bundling the plurality of insulating conductor strands such that a rectangular cross section of each of the plurality of insulating conductor strands is disposed in a matrix.

7. A superconducting rotating machine comprising the stator according to claim 5.

* * * * *